United States Patent [19]
Sakai et al.

[11] Patent Number: 4,633,075
[45] Date of Patent: Dec. 30, 1986

[54] SIGNAL ACCUMULATING TIME CONTROL METHOD AND APPARATUS FOR A SIGNAL ACCUMULATING TYPE RADIATION SENSING DEVICE

[75] Inventors: Shinji Sakai; Nobuhiko Shinoda; Takao Kinoshita, all of Tokyo; Kazuya Hosoe, Kunitachi, all of Japan

[73] Assignee: Canon Kabushiki Kaisha, Tokyo, Japan

[21] Appl. No.: 705,047

[22] Filed: Feb. 25, 1985

Related U.S. Application Data

[63] Continuation of Ser. No. 392,757, Jun. 28, 1982, abandoned.

[30] Foreign Application Priority Data

Jul. 8, 1981 [JP] Japan ................... 56-106341

[51] Int. Cl.⁴ .............................................. G01J 1/20
[52] U.S. Cl. ...................................... 250/201; 250/204
[58] Field of Search .................. 250/201, 204, 578; 354/406, 407, 409

[56] References Cited

U.S. PATENT DOCUMENTS

| | | | |
|---|---|---|---|
| 4,329,577 | 5/1982 | Asano et al. | 250/204 |
| 4,377,742 | 3/1983 | Kawabata et al. | 250/204 |
| 4,384,199 | 5/1983 | Ogino et al. | 250/204 |

*Primary Examiner*—David C. Nelms
*Assistant Examiner*—James G. Gatto
*Attorney, Agent, or Firm*—Fitzpatrick, Cella, Harper & Scinto

[57] ABSTRACT

Disclosed is a signal accumulating time control method for a signal accumulating type radiation sensing device which produces an electrical signal corresponding to the amount of incident radiation and accumulates the same. According to the improvement of the present invention, the accumulating time is controlled by successive approximation at different intervals when there happens a situation in which the accumulating time must be changed greatly.

7 Claims, 26 Drawing Figures

FIG. 3
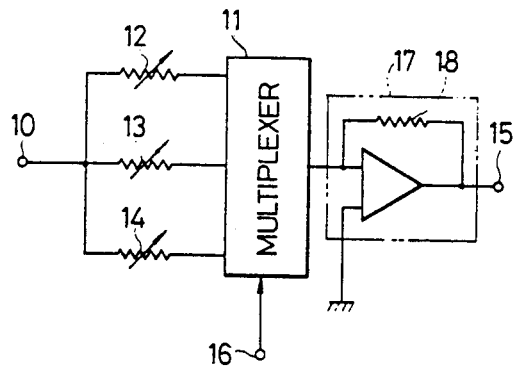
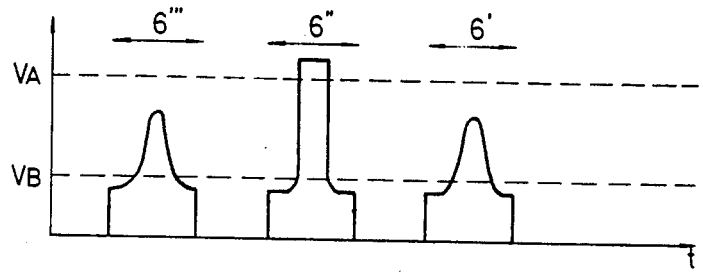
FIG. 4A
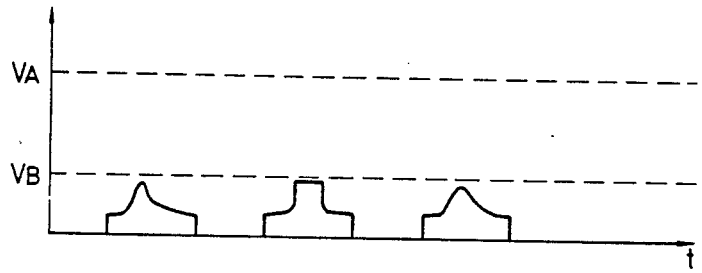
FIG. 4B
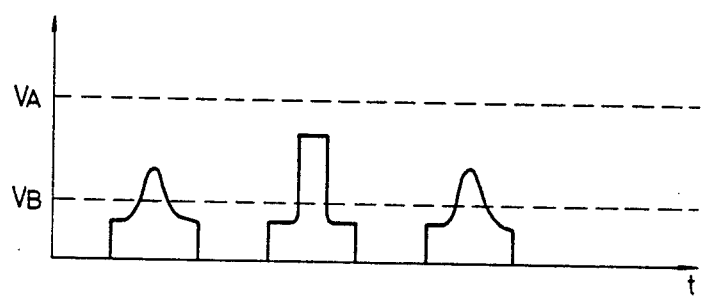
FIG. 4C

SIGNAL ACCUMULATING TIME CONTROL METHOD AND APPARATUS FOR A SIGNAL ACCUMULATING TYPE RADIATION SENSING DEVICE

This application is a continuation of application Ser. No. 392,757 filed June 28, 1982 now abandoned.

BACKGROUND OF THE INVENTION

1. Field of the Invention

This invention relates to a signal accumulating time control method and apparatus for a signal accumulating type radiation sensing device which produces an electrical signal corresponding to the amount of incident radiation and accumulates the same.

2. Description of the Prior Art

For example, in the use of a solid state image sensing device such as CCD which has been remarkably developed in recent years, it is known that the signal accumulating time thereof must be appropriately controlled in accordance with the amount of light incident on the light-receiving surface thereof to obtain a good image output. Various methods and apparatus for controlling the accumulating time have been proposed. However, in such solid state image sensing device, for example, in a case where it is necessary to change the accumulating time greatly as in the initiation of the operation of the device, a considerably long time is required until an appropriate accumulating time corresponding to the amount of light incident on the light-receiving surface of the device is reached, and a problem in the responsiveness arises in a case where any system operation is effected after an image signal is obtained. Particularly, in a camera or the like using such a solid state image sensing device (not only for image sensing but also including a focus detecting device, for example), the time required from the initiation of the operation until normal operation of the system is performed is a very important factor which determines the performance of the system, and the shorter this is, the more preferable it is. For example, in a feedback control method wherein the output level of the image sensing device is compared with a predetermined threshold (upper limit and lower limit) and on the basis of the result of the comparison, control of the accumulating time is effected in the next operation cycle, the above-described aggravation of the responsiveness at the initiation of operation of the system is undeniable. In such point, there is still left room for improvement.

SUMMARY OF THE INVENTION

In view of the above-noted situation, the present invention has as its primary object the provision of a novel, useful method and apparatus capable of performing a rapid and appropriate accumulating time control even in a case where it is necessary to change the accumulating time greatly as when the operation of a signal accumulating type radiation sensing device such as a solid state image sensing device or the like is initiated or the intensity of incident radiation fluctuates greatly in using such device.

It is another object of the present invention to provide, particularly in a system wherein on the basis of the output level of the sensing device, control of the accumulating time of the sensing device is performed in the next operation cycle, an accumulating time control method and apparatus capable of performing very suitable control of the signal accumulating time in a case where the accumulating time must be changed greatly as described above.

With such objects, according to the present invention, the technique of successive approximation is adopted in controlling the accumulating time.

Thus, the speed at which the accumulating time, in a case where a great change of the accumulating time is required, is controlled to a proper value is made very higher than in the prior art.

In this case, preferably, as shown in the embodiment of the present invention which will hereinafter be described, it is very useful to make such a design such that the control of the accumulating time by such successive approximation is performed at the initiation of operation of the system, whereby the accumulating time is controlled to a proper value, whereafter control of the accumulating time, for example, in the conventional follow-up mode, is performed. Thus, after the accumulating time is once controlled to a proper value, stable control is realized.

Other objects and features of the present invention will become apparent from the following detailed description of some embodiments thereof taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are model views for explaining the principle of focus detection operation of an example of a focus detecting system to which the present invention may be applied, wherein FIG. 1A shows the optical arrangement of the focus detecting system, FIG. 1B shows the configuration of light-receiving sections of a photoelectric transducer element shown in FIG. 1A, and FIG. 1C shows the changes in sharpness of the image at three points in FIG. 1A;

FIG. 3 is a partial circuit diagram showing an example of a balance adjusting circuit shown in the circuitry of FIG. 2;

FIGS. 4A to 4C show signal waveforms for explaining the function of a window comparator shown in FIG. 2 which discriminates if the accumulating time is appropriate;

DESCRIPTION OF THE PREFERRED EMBODIMENTS

Figure 1A:
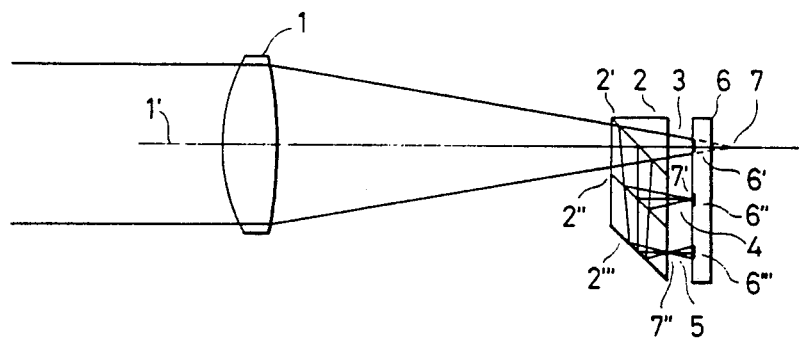

Referring first to FIG. 1A, an imaging lens 1 has an optical axis 1'. A beam splitter 2 is disposed in the optical path of the imaging lens 1 and has semi-transmittal sections 2' and 2" and a total reflection section 2'". As shown in FIG. 1A, light emerging from the imaging lens 1 becomes incident on the semi-transmittal section 2' of such beam splitter 2 and is then divided into three separate light rays 3, 4 and 5 by the semi-transmittal section 2" and the total reflection section 2'". If the semi-transmittal section 2' has a characteristic that it transmits about one third of the incident light and reflects the remaining two thirds and the other semi-transmittal section 2" has a characteristic that it transmits about one half of the incident light and reflects the remaining one half of the incident light, it is apparent that the energy for the three divided light rays becomes substantially the same. Designated by 6 is a photoelectric transducer such as a solid state image sensing element having three light-receiving sections 6', 6" and 6'".

If the convergent point of the light ray 3 by the imaging lens 1 is at point 7, it is easily seen that the convergent points of the divided light rays 4 and 5 are at points 7' and 7", respectively. If the convergent point of the light ray 4 which is reflected and divided by the semi-transmittal section 2" coincides with the light-receiving section 6", the convergent point 7 of the light ray 3 incident on the light-receiving section 6' is located behind the light-receiving section 6', and the convergent point 7" of the light ray 5 incident on the light-receiving section 6'" is located in front of the light-receiving section 6'". The deviations of these converging points from the light-receiving sections become the same if the distances between the semi-transmittal sections 2' and 2" and between 2" and the total reflection section 2'" are equal to each other. As a result, the sharpness of the image on the light-receiving section 6" becomes maximum, and the sharpnesses of the images on the light-receiving sections 6' and 6'" become low but are similar to each other.

Figure 1B:
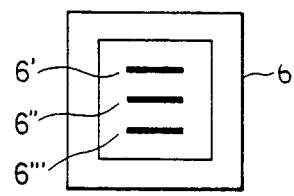
Figure 1C:
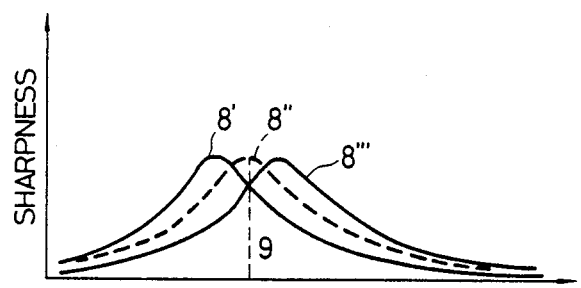

If the imaging lens 1 is displaced along the optical axis 1', the sharpnesses of the images on the light-receiving sections 6', 6" and 6'" change as shown in FIG. 1C. That is, curves 8', 8" and 8'" representing the sharpnesses of the images on the light-receiving sections 6', 6" and 6'" and the changes therein form three juxtaposed peaks in FIG. 1C, wherein the displacement of the imaging lens 1 is plotted as the abscissa (when rightward displacement takes place, the rightward displacement is rightward in the direction of the abscissa) and the sharpness is plotted as the ordinate. The condition shown in FIG. 1A corresponds to point 9 shown in FIG. 1C. If the light-receiving surface of the light-receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6'" are represented by the point 9 in FIG. 1C. Then, it is apparent from FIG. 1C that the relationships between the sharpnesses 8' and 8'" are inverted according to whether the imaging plane of the lens 1 is in front of or behind the light-receiving section 6". As a result, the near-focus state and the far-focus state of the imaging lens 1 with respect to the predetermined focal plane can be detected.

FIG. 1B is a front view of the photoelectric transducer 6 wherein the respective light-receiving sections 6', 6" and 6'" comprise, for example, belt-shaped linear CCDs. However, the shape of the light-receiving sections is not necessarily limited to this shape.

Figure 2:
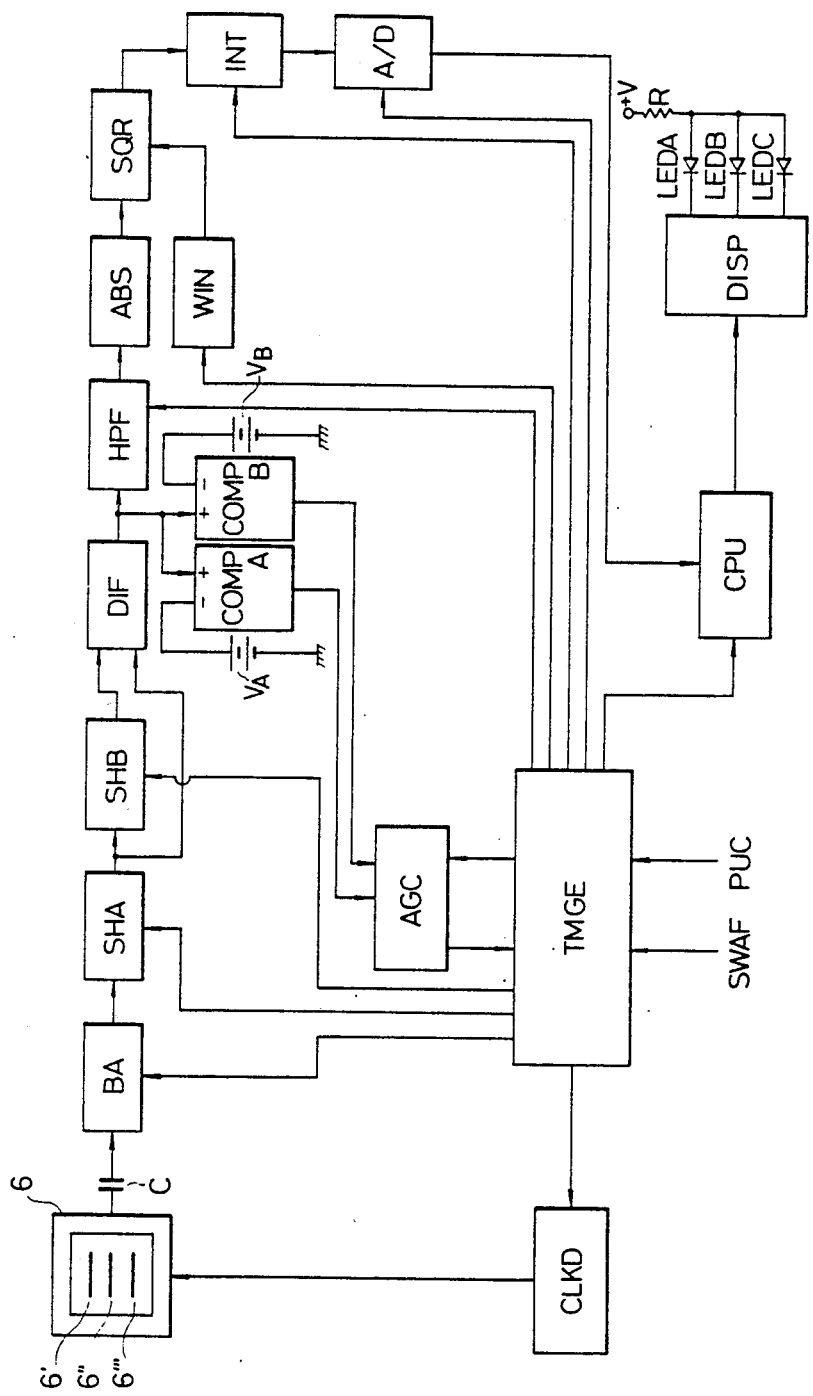
FIG. 2 is a block diagram showing the configuration of the electric circuitry of an embodiment in which the improvement of the present invention is applied to a focus detecting system according to the principle shown in FIGS. 1A to 1C.

A focus detecting system is thus obtained which employs the beam splitter 2 and the photoelectric transducer 6 having the three light-receiving sections 6', 6" and 6'". FIG. 2 shows a block diagram of an electric circuit which reads image signals from the light-receiving sections 6', 6" and 6'", extracts image sharpness signals from said image signals and discriminates the magnitudes of sharpness of the images at three points. Many of the blocks shown in FIG. 2 are of known configuration and details of them are shown in a series of applications such as U.S. patent application Ser. No. 59,635, "Focus Detecting System", Kinoshita et al, filed on July 23, 1979 (corresponding German DOLS No. 29 30 636), U.S. patent application Ser. No. 151,703, "Image Sharpness Detecting System", Kawabata et al, filed on May 20, 1980 (corresponding German Patent Application No. P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6" and 6'". A series of clock signals for operating the CCD 6 are supplied from a clock driver CLKD. These clock signals are supplied to initiate a series of operations of the CCD 6 such as charge accumulation, transfer, resetting, etc. in a predetermined order as is well known. The charge stored in the CCD 6 for a predetermined period of time and transferred therefrom is charge-voltage converted at the output of the CCD 6 and is thereafter input, as an image signal, to a balance adjusting circuit BA through a capacitor C for suppressing noise. These image signals corresponding to the three light-receiving sections 6', 6" and 6'" of the CCD 6 are time-serially read out in an order which is determined by the configuration of the CCD 6.

The balance adjusting circuit BA, as shown in FIG. 3, has a multiplexer 11 of known configuration and three variable resistors 12, 13 and 14 connected together. Referring to FIG. 3, the above-described image signal is applied to a terminal 10 and is supplied to the multiplexer 11 through the variable resistors 12, 13 and 14. A terminal 16 supplies multiplexer 11 with a signal which provides the input timing for image signals corresponding to the light-receiving sections 6', 6" and 6'". The multiplexer then puts output those image signals to an amplifier 17 through the variable resistors 12, 13 and 14. The variable resistors 12, 13 and 14 control the balance of the image signals from the light-receiving sections 6', 6" and 6"40 . The outputs from the resistors 12, 13 and 14 are input to the amplifier 17, where the gains of the respective images are controlled according to their ratios by a feedback resistor 18 before being applied to the next electric circuit. Balance adjustment of such image signals is useful when there is an inbalance in the three light rays 3, 4 and 5 divided by the beam splitter 2. The synchronizing signal provided from the terminal 16 is supplied from a timing generator TMGE which will hereinafter be described. Although three variable resistors are used in this embodiment, two variable resistors may of course be used to balance two image signals in relation to the remaining image signal.

Signal processing in this circuitry must be performed according to a series of synchronizing signals which are supplied from the timing generator TMGE. In response to an operation command signal SWAF of the circuitry (in the case of a camera, a signal generated in synchronism with the depression of a shutter release button to the first position) and a power up clear signal PUC, the timing generator TMGE generates the various synchronizing signals to the respective blocks in the circuitry in a predetermined order. The timing generator TMGE may be of known configuration and need only generate the group of synchronizing signals suitable for the operation of the circuitry of this embodiment. The clock driver CLKD also operates in response to the synchronizing signal from the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD are influenced by the dark current since the actual CCD comprises a semiconductor. Therefore, the actual image signal includes the dark current level superposed on the signal corresponding to the actual amount of incident light. Thus, the image signal as it is contains a noise component. Therefore, part of the light-receiving section of the CCD is masked with an aluminum mask or the like, and a signal output from this part is considered to be the dark current level. Then, the difference is obtained between the output from the unmasked light-receiving section and the output of the masked part (hereinafter referred to as a dark current bit), that is, the dark current level, to thereby remove the influence of the dark current. The dark current bit (not shown) is included at the end of each of the light-receiving sections 6', 6" and 6''' of the CCD 6 and is read out first. A second sampling and holding circuit SHB is arranged to serve to sample and hold the output level of these dark current bits. The second sampling and holding circuit SHB receives commands from the timing generator TMGE for holding said output level for a predetermined time. A differential amplifier DIF receives the output signal from the sampling and holding circuit SHA and the output signal from the sampling and holding circuit SHB to take the difference between these two inputs. Thus, the image signals obtained as the output of the differential amplifier DIF are signals whose dark current level is cancelled and which correctly correspond to the amount of incident light.

The output of the differential amplifier DIF is then input to a high-pass filter HPF and to two comparators COMPA and COMPB. A reference voltage VA is supplied to the comparator COMPA and a reference voltage VB is supplied to the comparator COMPB. These comparators COMPA and COMPB constitute a window comparator.

The operation of the window comparator will now be described with reference to FIG. 4. FIGS. 4A, 4B and 4C show the relationship between the peak value of the image signal compensated for by the dark current (hereinafter referred to as the dark current-compensated image signal) and the reference voltages VA and VB, the time being plotted as the abscissa and the voltage being plotted as the ordinate. The ranges in FIG. 4A indicated by arrows 6''', 6" and 6' represent the timings with which the image signals are output from the light-receiving sections 6''', 6" and 6', respectively, of the CCD 6. In FIG. 4A, part of the dark current-compensated signal (part of 6") exceeds the reference voltages VA and VB, and the signal level is too high. In this case, the outputs of both the comparators COMPA and COMPB are at high level. In FIG. 4B, the dark current-compensated signal is lower than the reference voltage VB in all ranges and the signal level is too low. In this case, the outputs of both the comparators COMPA and COMPB are at low level. In FIG. 4C, the peak value of the dark current-compensated signal is between the reference voltages VA and VB and is at a proper level. In this case, only the output of the comparator COMPB is at high level and the output of the comparator COMPA is at low level. If the reference voltages VA and VB are so selected as to set the proper level of the dark current-compensated signal in this circuitry, the combination of the high or low level of the outputs of the comparators COMPA and COMPB indicates the appropriateness of the dark current-compensated signal level. If $VA > VB$ in this embodiment, when the outputs of both the comparators COMPA and COMPB are at high level, it indicates that the dark current-compensated signal is at too high a level including a saturated level. When the outputs of both the comparators COMPA and COMPB are at low a level, it indicates that the dark current-compensated signal level is too low. Only when the output of the comparator COMPA is at low level and the output of the comparator COMPB is at high level, it indicates that the dark current-compensated signal is at a proper level.

The outputs of the comparators COMPA and COMPB are supplied to an accumulating time control circuit AGC to maintain the appropriate dark current-compensated signal level by shortening the accumulating time of the CCD 6 when it is too high and by prolonging the accumulating time when it is too low. In response to a synchronizing signal from the timing generator TMGE, the accumulating time control circuit AGC operates so that it may be able to discriminate the state of the outputs of the comparators COMPA and COMPB at the timing at which the dark current-compensated signals are output from the light-receiving sections 6', 6" and 6'''. Based on the output state of the comparators COMPA and COMPB, the accumulating time control circuit AGC outputs a command signal to shorten or prolong the accumulating time to the timing generator TMGE. In response to the command signal, the timing generator TMGE operates the clock driver CLKD so that the accumulating time of the CCD 6 may be shortened or prolonged when the next output of the CCD 6 is read out.

The high-pass filter HPF evaluates the degree of change in the image. The high-pass filter extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6" and 6''' of the CCD 6 are input. This is to prevent the generation of an output from the high-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (from light to dark and from dark to light), if the output of the high-pass filter HPF were directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may be realized by utilizing, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is higher. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6', 6" and 6'" of the CCD 6 and with the read-out of each element of the CCD 6, the window function generating circuit WIN controls the gain of the squaring circuit SQR according to the relationship predetermined in correspondence with the location (location in the field of view) at which each element is read out from the signal input time.

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6', 6" and 6'". In this manner, the output of the integrating circuit INT corresponds to the electric output such as the sharpness of the respective images corresponding to the order of output from the light-receiving sections 6', 6" and 6'" of the CCD.

The analog output of the integrating circuit INT is supplied to a conventional A-D converting circuit A/D for conversion into a digital value so that the signal processing may be facilitated for discrimination at a central processing unit CPU of an in-focus state, a near-focus state and a far-focus state of the imaging lens 1.

FIGS. 5A–5F show the output waveforms of the respective blocks of the circuitry in order to clarify the analog processing of the series of signals representing the sharpness of the image, starting from the read-out of the image signals from the light-receiving sections 6', 6" and 6'" of the CCD 6, i.e., the field of view for three images, until the integration at the integrating circuit INT. In FIGS. 5A–5F, time is plotted as the abscissa and the voltage or current output is plotted as the ordinate in arbitrary units. The ranges indicated at arrows 6', 6" and 6'" in FIG. 5 represent the timings with which the signals corresponding to the light-receiving sections 6', 6" and 6'" of the CCD 6 are read out and processed. The state of the respective images corresponds to the in-focus state of the imaging lens 1 in which the sharpness of the image of the light-receiving section 6" is highest, that is, the sharpness as shown at 9 in FIG. 1C is highest. FIG. 5 shows the state of the signal output from the CCD 6 only once, but these signals are repeatedly output in practice.

Figure 5A:
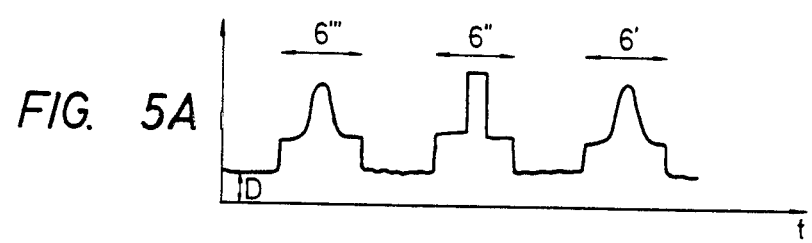
FIGS. 5A to 5F show output waveforms of the outputs of the main blocks of the circuitry shown in FIG. 2.
Figure 5B:
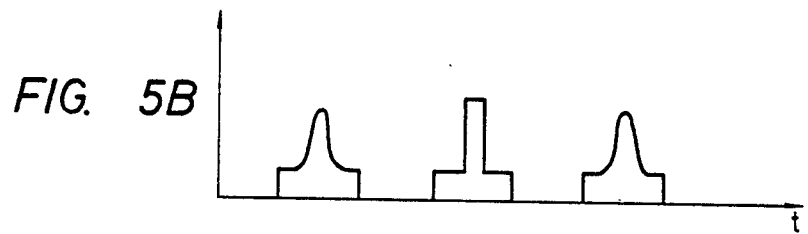
Figure 5C:
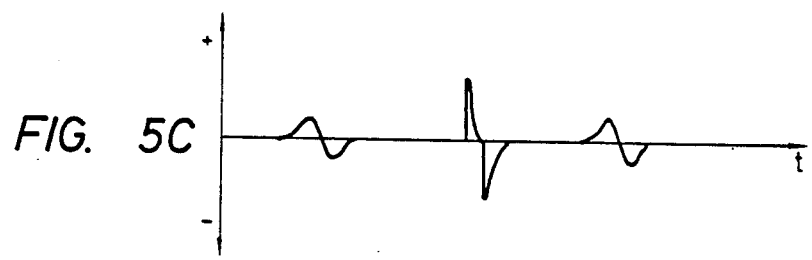
Figure 5D:
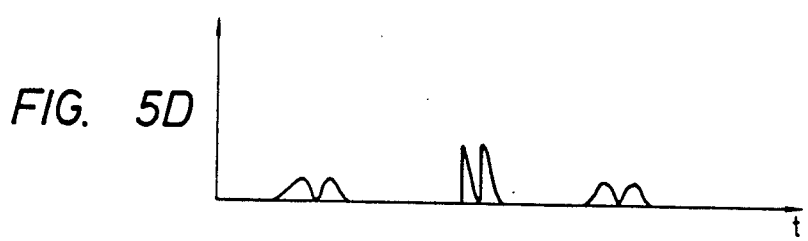
Figure 5E:
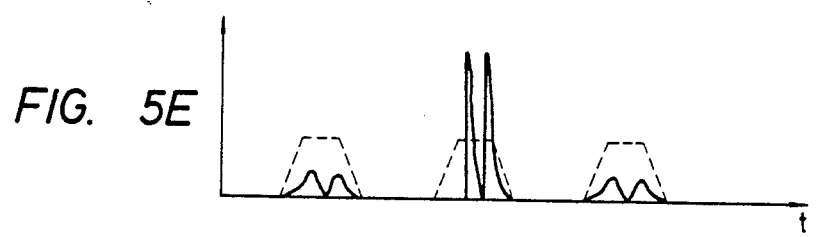
Figure 5F:
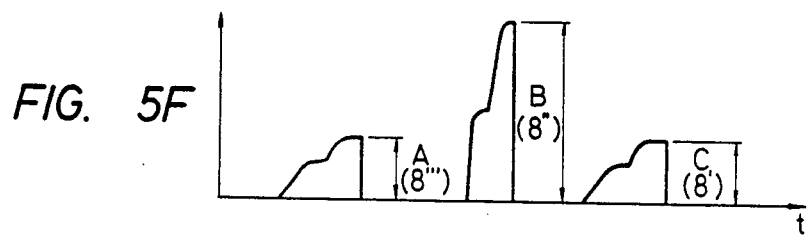

FIG. 5A shows the image signal which is output from the CCD 6 and has passed through the sampling and holding circuit SHA. The order for output of the images from the light-receiving sections is 6'", 6" and 6'. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by broken lines show the manner in which the gain of the squaring circuit SQR changes within the field of view according to the shape of the window generated by the window function generating circuit WIN described above. FIG. 5F shows the output of the integrating circuit INT wherein levels A(8'"), B(8") and C(8') correspond to the sharpness of the images on the light-receiving sections 6'", 6" and 6', respectively, and are called A, B and C. Specifically, A, B and C in FIG. 5F correspond to the levels of the curves 8'", 8" and 8' of FIG. 1C at the point 9.

The levels A, B and C are converted into digital data by the A-D converting circuit A/D described above and are input to the central processing circuit CPU. The CPU computes the relationships among the levels A, B and C according to the conditions of the in-focus state, the near-focus state, the far-focus state and the interruption of the discrimination which are set in advance. Basically, in the in-focus state, conditions B>A, B>C and A=C are satisfied, in the near-focus state, condition C>A is satisfied, and in the far-focus state, condition A>C is satisfied. The CPU discriminates which set of conditions is satisfied and outputs a signal corresponding to one of these three states. As the algorithm for the discrimination at the CPU, there may be adopted the algorithm as disclosed in U.S. patent application Ser. No. 151,533, "Focus Detecting System", Sakai et al, filed on May 19, 1980 (corresponding German Patent Application No. P 30 19 901.0) or in U.S. patent application Ser. No. 310,373, "Focusing State Discriminating System", Sakai et al, filed on Oct. 9, 1981, both filed in behalf of the assignee of the present invention.

The output of the central processing circuit CPU is input to a subsequent display circuit DISP. The display circuit DISP basically comprises a logic circuit and a drive circuit for driving indicators such as LEDs. In response to the commands from the central processing circuit CPU, in this embodiment, the display circuit DISP lights up a light-emitting diode LEDA in the in-focus state, lights up a light-emitting diode in the near-focus state, or lights up a light-emitting diode LEDS in the far-focus state, to indicate that the imaging lens 1 is in the in-focus state, the near-focus state or the far-focus state, respectively. A protective resistor R is incorporated to protect the light-emitting diodes LEDA to LEDC when a voltage V is supplied to them. Although LEDs are used as the indicators in this embodiment, liquid crystal display devices, electrochromines or the like may be used.

The configuration of the timing generator TMGE will be described with reference to FIGS. 6 and 7.

Figure 6:
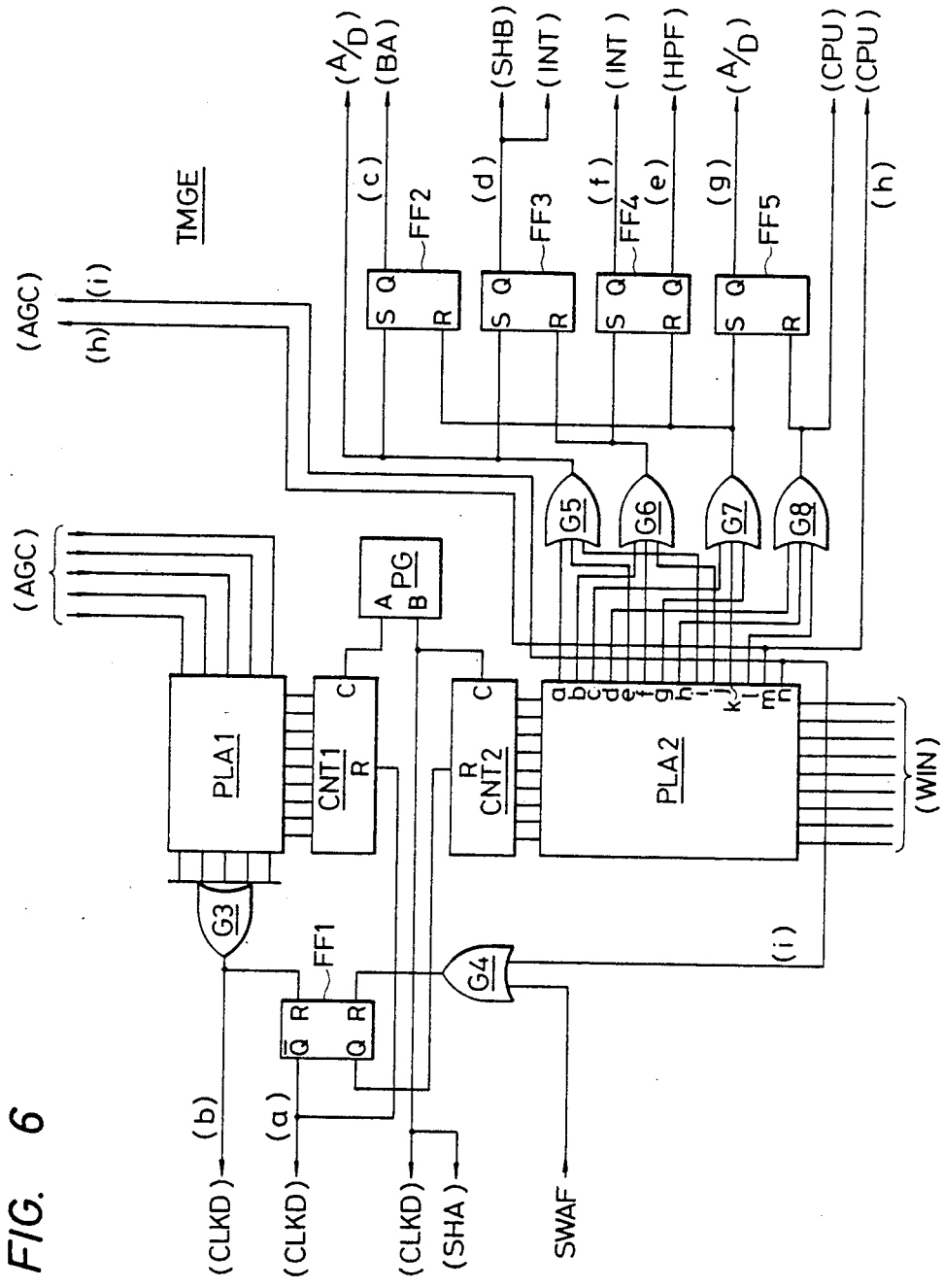
FIG. 6 is a block diagram showing the configuration of a timing generator in the circuitry shown in FIG. 2.
Figure 7:
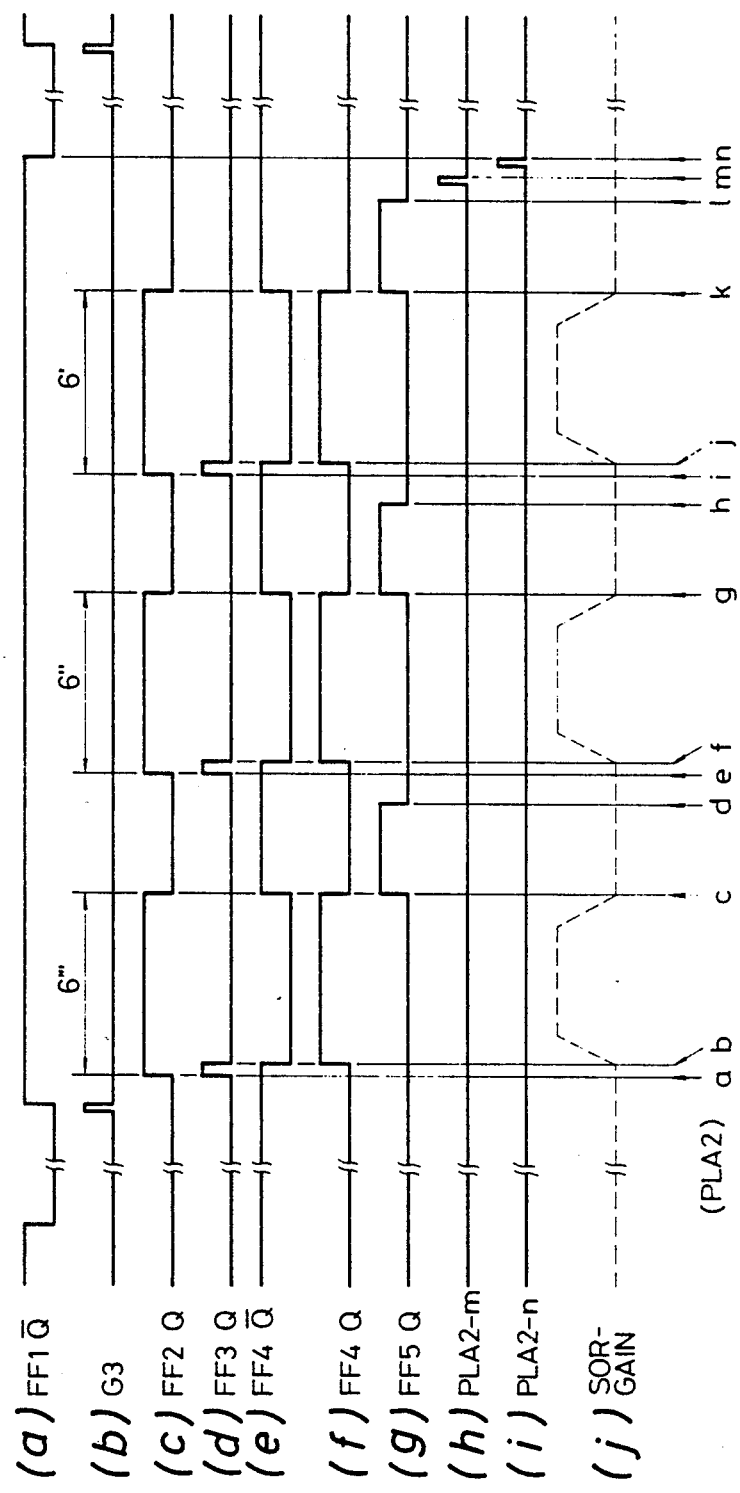
FIG. 7 is a timing chart showing timing signals for controlling various operations which are output from the timing generator shown in FIG. 6.

Referring to FIG. 6, the part of the circuitry consisting of a counter CNT1, a programmable logic array PLA1 and an OR gate G3 mainly serves to regulate the accumulating time of the CCD 6. The counter CNT1 counts a pulse train A from a pulse generator PG. When the count of the counter CNT1 reaches a predetermined value which is set by the output of an accumulating time control circuit AGC to be described, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the output of the signals from the CCD 6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\bar{Q}$ output of the RS flip-flop FF1 as shown in FIG. 7(a) is supplied as a control signal to the clock driver CLKD. The CCD 6 has an overflow drain gate which is opened or closed according to the $\bar{Q}$ output of the RS flip-flop FF1 (the gate is opened when the $\bar{Q}$ output is at high level and is closed when it is at low level) to thereby control the integration of the signal charge by the CCD 6. The interval shown in FIG. 7(a) in which the $\bar{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the accumulating time control circuit AGC, the accumulating time of the signal charge of the CCD 6 is regulated by the output of the accumulating time control circuit AGC. The $\bar{Q}$ output of the RS flip-flop FF1 is supplied to the counter CNT1 as a reset signal. Therefore, the counter CNT1 performs counting only during the interval in which the $\bar{Q}$ output of the flip-flop FF1 is at low level, and is kept reset in other conditions.

The circuitry part consisting of a counter CNT2, a programmable logic array PLA2, OR gates G5-G8, and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) of the CCD 6 are in one-to-one correspondence. The pulse train B is also supplied to the sampling and holding circuit SHA as the sampling pulse. The content of the programmable logic array PLA2 is so programmed that, based on the count output from the counter CNT2, pulses are generated from terminals a to n at the respective timings shown in FIGS. 7(a) to 7(n) after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminals d, h and l of the programmable logic array PLA2, the OR gate G8 produces an output which is supplied to the reset terminal of the RS flip-flop FF5. The Q outputs of the RS flip-flops FF2 to FF5 and the $\bar{Q}$ output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\bar{Q}$ output (FIG. 7(e)) of the RS flip-flop FF4 corresponds to the effective image signal bit of the output of each of the light-receiving sections 6''', a 6'' and 6', and is supplied to the high-pass filter HPF as a reset signal. In this manner, the high-pass filter HPF is released from the reset condition only during the low level interval of the $\bar{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D convertion circuit A/D as an A-D conversion command. The output of the OR gate G5 is supplied to the A-D converting circuit as a reset signal. The output of the OR gate G3 is supplied to the central processing circuit CPU as a strobe pulse for storing the output from the A-D converting circuit A/D. The output (FIG. 7(h)) from the terminal m of the programmable logic array PLA2 is supplied to the accumulating time control circuit AGC as a strobe pulse for a group of accumulating time data storing D-flip-flops to be described in the accumulating time control circuit AGC and also to the central processing unit CPU as a latch pulse for latching the outputs thereof. The output (FIG. 7(i)) from the terminal n of the programmable logic array PLA2 is supplied to the OR gate G4 as a set signal of the RS flip-flop FF1 as well as to the accumulating time control circuit AGC as a reset signal for the detecting flip-flop therein to be described. The Q output of the flip-flop FF1 (the inverted signal of the $\bar{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(j). The window function generating circuit WIN may be of the configuration as disclosed in U.S. patent application Ser. No. 151,703, filed on May 20, 1980 by Kawabata et al (corresponding German Patent Application No. P 30 19 908.7) of the assignee of the present invention.

A specific example of the accumulating time control circuit AGC designed to control the accumulating time of the CCD 6 to a proper value at high speed during the starting of the device in accordance with the improvement of the present invention will now be described as an embodiment of the present invention with reference to FIG. 8.

Figure 8:
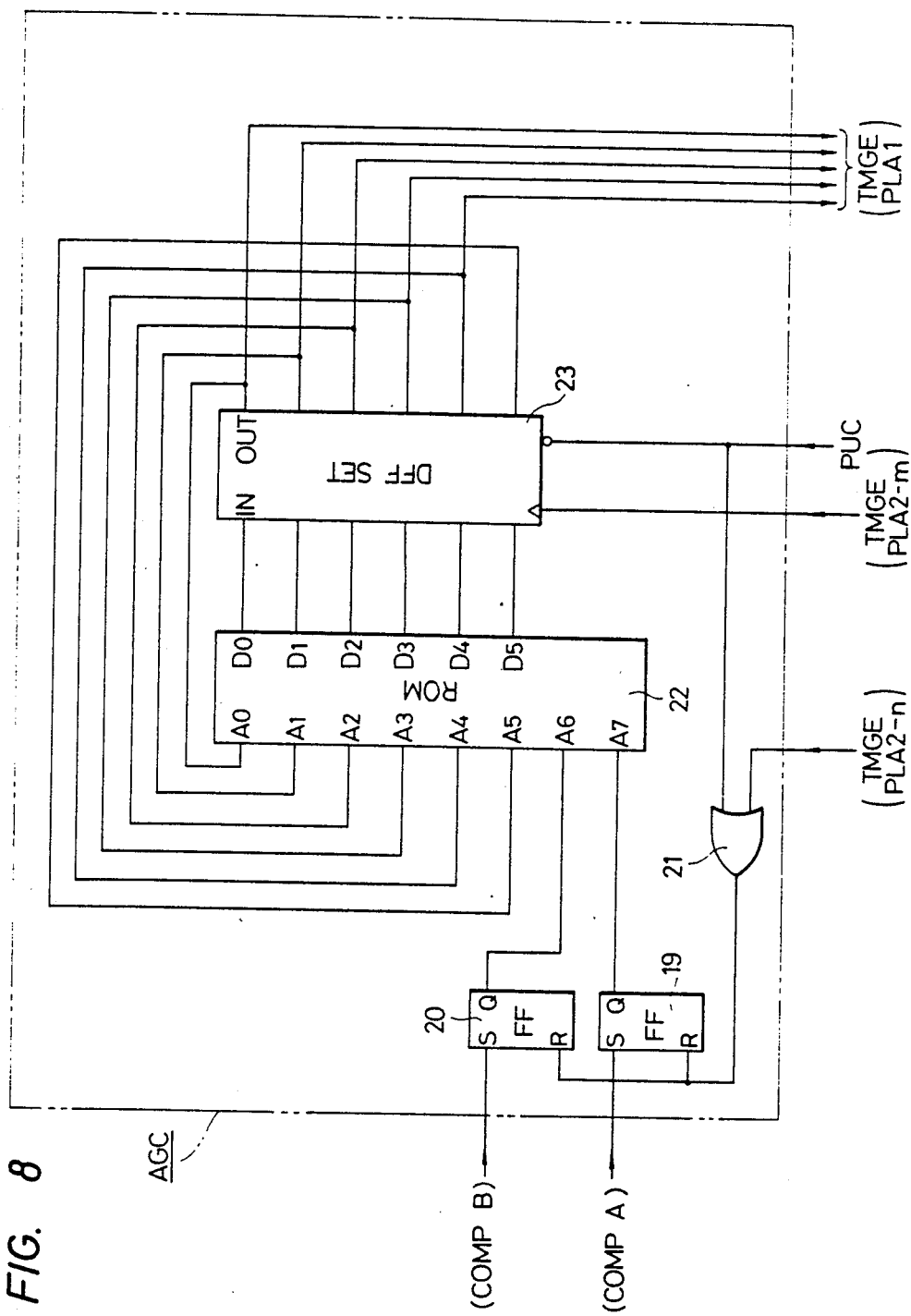
FIG. 8 is a block diagram showing as an embodiment of the present invention an example of the accumulating time control circuit in a case where the present invention is applied to the circuitry shown in FIG. 2.

Referring to FIG. 8, reference numerals 19 and 20 designate RS flip-flops. The flip-flop 19 is set by the high level of the output of the comparator COMPA and the flip-flop 20 is set by the high level of the output of the comparator COMPB. Both of these flip-flops are so connected that they are reset by the power up clear signal PUC supplied through an OR gate 21 and the high level of the output (FIG. 7(i)) from the terminal n of the programmable logic array PLA2 in the timing generator TMGE shown in FIG. 6. Reference numeral 22 designates an ROM (read only memory), and reference numeral 23 denotes a D-flip-flop set of 6 bit construction. The inputs $A_0$–$A_5$ of the ROM 22 receive the outputs of the flip-flop set 23 and the inputs $A_6$ and $A_7$ of the ROM 22 receive the Q outputs of the flip-flops 20 and 19. The outputs $D_0$–$D_4$ of the ROM 22 produce output data determined by the state of the Q outputs of the flip-flops 20 and 19 and the state of the inputs $A_0$–$A_5$. $D_5$ is an output which performs another command for successive approximation or follow-up control. The outputs $D_0$–$D_5$ of the ROM 22 are connected to the inputs of the D-flip-flop set 23 of 6 bit construction. For each accumulating time receiving strobe from the timing generator TMGE (the high level output from the terminal m of the programmable logic array PLA2 of FIG. 6–FIG. 7(h)), the signals of $D_0$–$D_5$ are latched by the flip-flop set 23 and are supplied to the timing generator TMGE as the accumulating time control signal and also fed back to the ROM 22 with the state thereof as the input data to the inputs $A_0$–$A_5$ of the ROM 22. The power up clear signal PUC is produced when the main switch of the system is closed, and this signal clears the D-flip-flop set 23. When the power up clear signal PUC is input to the ROM 22, the state of "0" is provided as the signals of the inputs $A_0$–$A_5$ thereof.

The operation of the accumulating time control circuit AGC having the above-described construction will be described by reference to TABLE I below which shows the transition of the states of inputs and outputs.

TABLE I

| | | | | | | |
|---|---|---|---|---|---|---|
| COMPB(ADR6) | 0 | 1 | 1 | 0 | 1 | 1 |
| COMPA(ADR7) | 0 | 0 | 1 | 0 | 0 | 1 |
| UD/SA(ADR5) | 0 | 0 | 0 | 1 | 1 | 1 |
| OLD DATA(ADR0-4)= 0 | 16($D_5$=0) | 16($D_5$=0) | 16($D_5$=0) | 1($D_5$=1) | 0($D_5$=1) | 0($D_5$=1) |
| OLD DATA(ADR0-4)= 1 | 0($D_5$=0) | 1($D_5$=1) | 0($D_5$=0) | 2($D_5$=1) | 1($D_5$=1) | 0($D_5$=1) |
| OLD DATA(ADR0-4)= 2 | 0($D_5$=0) | 2($D_5$=1) | 0($D_5$=0) | 3($D_5$=1) | 2($D_5$=1) | 1($D_5$=1) |
| OLD DATA(ADR0-4)= 3 | 0($D_5$=0) | 3($D_5$=1) | 0($D_5$=0) | 4($D_5$=1) | 3($D_5$=1) | 2($D_5$=1) |
| OLD DATA(ADR0-4)= 4 | 6($D_5$=1) | 4($D_5$=1) | 2($D_5$=1) | 5($D_5$=1) | 4($D_5$=1) | 3($D_5$=1) |
| OLD DATA(ADR0-4)= 5 | 0($D_5$=0) | 5($D_5$=1) | 0($D_5$=0) | 6($D_5$=1) | 5($D_5$=1) | 4($D_5$=1) |
| OLD DATA(ADR0-4)= 6 | 0($D_5$=0) | 6($D_5$=1) | 0($D_5$=0) | 7($D_5$=1) | 6($D_5$=1) | 5($D_5$=1) |
| OLD DATA(ADR0-4)= 7 | 0($D_5$=0) | 7($D_5$=1) | 0($D_5$=0) | 8($D_5$=1) | 7($D_5$=1) | 6($D_5$=1) |
| OLD DATA(ADR0-4)= 8 | 12($D_5$=0) | 8($D_5$=1) | 4($D_5$=0) | 9($D_5$=1) | 8($D_5$=1) | 7($D_5$=1) |
| OLD DATA(ADR0-4)= 9 | 0($D_5$=0) | 9($D_5$=1) | 0($D_5$=0) | 10($D_5$=1) | 9($D_5$=1) | 8($D_5$=1) |
| OLD DATA(ADR0-4)=10 | 0($D_5$=0) | 10($D_5$=1) | 0($D_5$=0) | 11($D_5$=1) | 10($D_5$=1) | 9($D_5$=1) |
| OLD DATA(ADR0-4)=11 | 0($D_5$=0) | 11($D_5$=1) | 0($D_5$=0) | 12($D_5$=1) | 11($D_5$=1) | 10($D_5$=1) |
| OLD DATA(ADR0-4)=12 | 14($D_5$=1) | 12($D_5$=1) | 10($D_5$=0) | 13($D_5$=1) | 12($D_5$=1) | 11($D_5$=1) |
| OLD DATA(ADR0-4)=13 | 0($D_5$=0) | 13($D_5$=1) | 0($D_5$=0) | 14($D_5$=1) | 13($D_5$=1) | 12($D_5$=1) |
| OLD DATA(ADR0-4)=14 | 0($D_5$=0) | 14($D_5$=1) | 0($D_5$=0) | 15($D_5$=1) | 14($D_5$=1) | 13($D_5$=1) |
| OLD DATA(ADR0-4)=15 | 0($D_5$=0) | 15($D_5$=1) | 0($D_5$=0) | 16($D_5$=1) | 15($D_5$=1) | 14($D_5$=1) |
| OLD DATA(ADR0-4)=16 | 24($D_5$=0) | 16($D_5$=1) | 8($D_5$=0) | 17($D_5$=1) | 16($D_5$=1) | 15($D_5$=1) |
| OLD DATA(ADR0-4)=17 | 0($D_5$=0) | 17($D_5$=1) | 0($D_5$=0) | 18($D_5$=1) | 17($D_5$=1) | 16($D_5$=1) |
| OLD DATA(ADR0-4)=18 | 0($D_5$=0) | 18($D_5$=1) | 0($D_5$=0) | 19($D_5$=1) | 18($D_5$=1) | 17($D_5$=1) |
| OLD DATA(ADR0-4)=19 | 0($D_5$=0) | 19($D_5$=1) | 0($D_5$=0) | 20($D_5$=1) | 19($D_5$=1) | 18($D_5$=1) |
| OLD DATA(ADR0-4)=20 | 22($D_5$=1) | 20($D_5$=1) | 18($D_5$=1) | 21($D_5$=1) | 20($D_5$=1) | 19($D_5$=1) |
| OLD DATA(ADR0-4)=21 | 0($D_5$=0) | 21($D_5$=1) | 0($D_5$=0) | 22($D_5$=1) | 21($D_5$=1) | 20($D_5$=1) |
| OLD DATA(ADR0-4)=22 | 0($D_5$=0) | 22($D_5$=1) | 0($D_5$=0) | 23($D_5$=1) | 22($D_5$=1) | 21($D_5$=1) |
| OLD DATA(ADR0-4)=23 | 0($D_5$=0) | 23($D_5$=1) | 0($D_5$=0) | 24($D_5$=1) | 23($D_5$=1) | 22($D_5$=1) |
| OLD DATA(ADR0-4)=24 | 28($D_5$=0) | 24($D_5$=1) | 20($D_5$=0) | 25($D_5$=1) | 24($D_5$=1) | 23($D_5$=1) |
| OLD DATA(ADR0-4)=25 | 0($D_5$=0) | 25($D_5$=1) | 0($D_5$=0) | 26($D_5$=1) | 25($D_5$=1) | 24($D_5$=1) |
| OLD DATA(ADR0-4)=26 | 0($D_5$=0) | 26($D_5$=1) | 0($D_5$=0) | 27($D_5$=1) | 26($D_5$=1) | 25($D_5$=1) |
| OLD DATA(ADR0-4)=27 | 0($D_5$=0) | 27($D_5$=1) | 0($D_5$=0) | 28($D_5$=1) | 27($D_5$=1) | 26($D_5$=1) |
| OLD DATA(ADR0-4)=28 | 30($D_5$=1) | 28($D_5$=1) | 26($D_5$=1) | 29($D_5$=1) | 28($D_5$=1) | 27($D_5$=1) |
| OLD DATA(ADR0-4)=29 | 0($D_5$=0) | 29($D_5$=1) | 0($D_5$=0) | 30($D_5$=1) | 29($D_5$=1) | 28($D_5$=1) |
| OLD DATA(ADR0-4)=30 | 0($D_5$=0) | 30($D_5$=1) | 0($D_5$=0) | 31($D_5$=1) | 30($D_5$=1) | 29($D_5$=1) |
| OLD DATA(ADR0-4)=31 | 0($D_5$=0) | 31($D_5$=1) | 0($D_5$=0) | 31($D_5$=1) | 31($D_5$=1) | 30($D_5$=1) |

In Table I, COMPA (ADR7) and COMPB (ADR6) show the states of the Q outputs of the flip-flops 19 and 20, repectively, which respond to the outputs of the comparators COMPA and COMPB, respectively. That is, when both of these outputs are "0", it indicates a case where the accumulating time is too short and the image signal is at insufficient level, and when both of these outputs are "1", it indicates a case where the accumulating time is too long and the image signal is saturated. COMPB="1" and COMPA="0" indicate that a proper image signal is obtained. UD/$\overline{SA}$ (ADR5) represents the discrimination between the successive approximation mode and the follow-up control mode, "0" represents the successive approximation mode, and "1" represents the follow-up control mode. OLD DATA (ADR0-4)=i (i=0,1,2,...,31) in each line corresponds to the state of the inputs $A_0$–$A_4$ of the ROM 22, namely, the accumulating time set by the previous strobe of accumulating time renewal, and a suitable length of accumulating time corresponds to each i as a longer accumulating time is i is greater. The data of each line and row indicates to which accumulating time the accumulating time should shift in accordance with the mode represented by the current data of COMPA and COMPB and UD/$\overline{SA}$ relative to the accumulating time condition set by the previous strobe. As regards $D_5$="0" or $D_5$="1" in the parentheses affixed to said data, the former shows the command for holding the successive approximation mode and the latter shows the command for shifting to the follow-up control mode. For example, when, at the start of operation of the system, the power up clear signal PUC is imparted to the D-flip-flop set 23, all of the inputs $A_0$–$A_4$ assume "0" (the first column OLD DATA (ADR0-4)=0). In this state, $D_5$="0" and therefore, the successive approximation mode dominates by all means. Irrespective of the states of COMPA and COMPB, the accumulating time is prolonged to "16" in the next strobe while the successive approximation mode remains dominant (arrow A). If, in this state, COMPA=COMPB="0", that is, if the accumulating time is too short, the accumulating time is prolonged to "24" in the next strobe (arrow B). Thus, in such a case, the accumulating time is not prolonged step by step, but it skips to the middle of all steps (32) and then shift one half toward the longer side from the middle, namely, to "24". If, in the next strobe, COMPA=COMPB="1", that is, the accumulating time becomes too long, the accumulating time is set to "20" in the next strobe (arrow C). This is the medium of the previous cycle ("24") and the further previous cycle ("16"), and the accumulating time is controlled in the fashion of successive approximation. If, in this state, COMPA="0" and COMPB="1", that is, an appropriate accumulating time is set, the accumulating time is also "20" in the next strobe and $D_5$="1", and thus the mode shifts to the follow-up control mode. Once the mode has shifted to the follow-up control mode, the accumulating time is thereafter controlled step by step in accordance with the combination of the outputs of the comparators COMPA and COMPB.

As will be seen from the foregoing, the successive approximation mode is a control method of gradually changing the set value toward an unknown proper value, so that the difference thereof from the unknown proper value becomes smaller, namely, changing the set value greatly at first and then gradually at a smaller range as the proper value is approached. The follow-up control mode is a step by step control method in which if COMPA="0" and COMPB="1", the set value is not changed as in the prior art, but when COMPA=COMPB="0", the set value is increased by one step, that is, the accumulating time is prolonged by one step and when COMPA=COMPB="1", the set value is decreased by one step, that is, the accumulating time is shortened by one step.

The program of the ROM 22 required to obtain the control operation as described above is shown in Table II below.

TABLE II

| | | (ROM IN) | | | | | | | | | | | | (ROM OUT) | | | | | | | | |
|---|---|---|---|---|---|---|---|---|---|---|---|---|---|---|---|---|---|---|---|---|---|---|
| | | $A_7$ | $A_6$ | $A_5$ | $A_4$ | $A_3$ | $A_2$ | $A_1$ | $A_0$ | | | | | $D_5$ | $D_4$ | $D_3$ | $D_2$ | $D_1$ | $D_0$ | | |
| ADDRESS = | 0 | ( 0 | 0 | 0 | 0 | 0 | 0 | 0 | 0 | B | ) | DATA = | 16 | ( 0 | 1 | 0 | 0 | 0 | 0 | B | ) |
| ADDRESS = | 1 | ( 0 | 0 | 0 | 0 | 0 | 0 | 0 | 1 | B | ) | DATA = | 0 | ( 0 | 0 | 0 | 0 | 0 | 0 | B | ) |
| ADDRESS = | 2 | ( 0 | 0 | 0 | 0 | 0 | 0 | 1 | 0 | B | ) | DATA = | 0 | ( 0 | 0 | 0 | 0 | 0 | 0 | B | ) |
| ADDRESS = | 3 | ( 0 | 0 | 0 | 0 | 0 | 0 | 1 | 1 | B | ) | DATA = | 0 | ( 0 | 0 | 0 | 0 | 0 | 0 | B | ) |
| ADDRESS = | 4 | ( 0 | 0 | 0 | 0 | 0 | 1 | 0 | 0 | B | ) | DATA = | 38 | ( 1 | 0 | 0 | 1 | 1 | 0 | B | ) |
| ADDRESS = | 5 | ( 0 | 0 | 0 | 0 | 0 | 1 | 0 | 1 | B | ) | DATA = | 0 | ( 0 | 0 | 0 | 0 | 0 | 0 | B | ) |
| ADDRESS = | 6 | ( 0 | 0 | 0 | 0 | 0 | 1 | 1 | 0 | B | ) | DATA = | 0 | ( 0 | 0 | 0 | 0 | 0 | 0 | B | ) |
| ADDRESS = | 7 | ( 0 | 0 | 0 | 0 | 0 | 1 | 1 | 1 | B | ) | DATA = | 0 | ( 0 | 0 | 0 | 0 | 0 | 0 | B | ) |
| ADDRESS = | 8 | ( 0 | 0 | 0 | 0 | 1 | 0 | 0 | 0 | B | ) | DATA = | 12 | ( 0 | 0 | 1 | 1 | 0 | 0 | B | ) |
| ADDRESS = | 9 | ( 0 | 0 | 0 | 0 | 1 | 0 | 0 | 1 | B | ) | DATA = | 0 | ( 0 | 0 | 0 | 0 | 0 | 0 | B | ) |
| ADDRESS = | 10 | ( 0 | 0 | 0 | 0 | 1 | 0 | 1 | 0 | B | ) | DATA = | 0 | ( 0 | 0 | 0 | 0 | 0 | 0 | B | ) |
| ADDRESS = | 11 | ( 0 | 0 | 0 | 0 | 1 | 0 | 1 | 1 | B | ) | DATA = | 0 | ( 0 | 0 | 0 | 0 | 0 | 0 | B | ) |
| ADDRESS = | 12 | ( 0 | 0 | 0 | 0 | 1 | 1 | 0 | 0 | B | ) | DATA = | 46 | ( 1 | 0 | 1 | 1 | 1 | 0 | B | ) |
| ADDRESS = | 13 | ( 0 | 0 | 0 | 0 | 1 | 1 | 0 | 1 | B | ) | DATA = | 0 | ( 0 | 0 | 0 | 0 | 0 | 0 | B | ) |
| ADDRESS = | 14 | ( 0 | 0 | 0 | 0 | 1 | 1 | 1 | 0 | B | ) | DATA = | 0 | ( 0 | 0 | 0 | 0 | 0 | 0 | B | ) |
| ADDRESS = | 15 | ( 0 | 0 | 0 | 0 | 1 | 1 | 1 | 1 | B | ) | DATA = | 0 | ( 0 | 0 | 0 | 0 | 0 | 0 | B | ) |
| ADDRESS = | 16 | ( 0 | 0 | 0 | 1 | 0 | 0 | 0 | 0 | B | ) | DATA = | 24 | ( 0 | 1 | 1 | 0 | 0 | 0 | B | ) |
| ADDRESS = | 17 | ( 0 | 0 | 0 | 1 | 0 | 0 | 0 | 1 | B | ) | DATA = | 0 | ( 0 | 0 | 0 | 0 | 0 | 0 | B | ) |
| ADDRESS = | 18 | ( 0 | 0 | 0 | 1 | 0 | 0 | 1 | 0 | B | ) | DATA = | 0 | ( 0 | 0 | 0 | 0 | 0 | 0 | B | ) |
| ADDRESS = | 19 | ( 0 | 0 | 0 | 1 | 0 | 0 | 1 | 1 | B | ) | DATA = | 0 | ( 0 | 0 | 0 | 0 | 0 | 0 | B | ) |
| ADDRESS = | 20 | ( 0 | 0 | 0 | 1 | 0 | 1 | 0 | 0 | B | ) | DATA = | 54 | ( 1 | 1 | 0 | 1 | 1 | 0 | B | ) |
| ADDRESS = | 21 | ( 0 | 0 | 0 | 1 | 0 | 1 | 0 | 1 | B | ) | DATA = | 0 | ( 0 | 0 | 0 | 0 | 0 | 0 | B | ) |
| ADDRESS = | 22 | ( 0 | 0 | 0 | 1 | 0 | 1 | 1 | 0 | B | ) | DATA = | 0 | ( 0 | 0 | 0 | 0 | 0 | 0 | B | ) |
| ADDRESS = | 23 | ( 0 | 0 | 0 | 1 | 0 | 1 | 1 | 1 | B | ) | DATA = | 0 | ( 0 | 0 | 0 | 0 | 0 | 0 | B | ) |
| ADDRESS = | 24 | ( 0 | 0 | 0 | 1 | 1 | 0 | 0 | 0 | B | ) | DATA = | 28 | ( 0 | 1 | 1 | 1 | 0 | 0 | B | ) |
| ADDRESS = | 25 | ( 0 | 0 | 0 | 1 | 1 | 0 | 0 | 1 | B | ) | DATA = | 0 | ( 0 | 0 | 0 | 0 | 0 | 0 | B | ) |
| ADDRESS = | 26 | ( 0 | 0 | 0 | 1 | 1 | 0 | 1 | 0 | B | ) | DATA = | 0 | ( 0 | 0 | 0 | 0 | 0 | 0 | B | ) |
| ADDRESS = | 27 | ( 0 | 0 | 0 | 1 | 1 | 0 | 1 | 1 | B | ) | DATA = | 0 | ( 0 | 0 | 0 | 0 | 0 | 0 | B | ) |
| ADDRESS = | 28 | ( 0 | 0 | 0 | 1 | 1 | 1 | 0 | 0 | B | ) | DATA = | 62 | ( 1 | 1 | 1 | 1 | 1 | 0 | B | ) |
| ADDRESS = | 29 | ( 0 | 0 | 0 | 1 | 1 | 1 | 0 | 1 | B | ) | DATA = | 0 | ( 0 | 0 | 0 | 0 | 0 | 0 | B | ) |
| ADDRESS = | 30 | ( 0 | 0 | 0 | 1 | 1 | 1 | 1 | 0 | B | ) | DATA = | 0 | ( 0 | 0 | 0 | 0 | 0 | 0 | B | ) |
| ADDRESS = | 31 | ( 0 | 0 | 0 | 1 | 1 | 1 | 1 | 1 | B | ) | DATA = | 0 | ( 0 | 0 | 0 | 0 | 0 | 0 | B | ) |
| ADDRESS = | 32 | ( 0 | 0 | 1 | 0 | 0 | 0 | 0 | 0 | B | ) | DATA = | 33 | ( 1 | 0 | 0 | 0 | 0 | 1 | B | ) |
| ADDRESS = | 33 | ( 0 | 0 | 1 | 0 | 0 | 0 | 0 | 1 | B | ) | DATA = | 34 | ( 1 | 0 | 0 | 0 | 1 | 0 | B | ) |
| ADDRESS = | 34 | ( 0 | 0 | 1 | 0 | 0 | 0 | 1 | 0 | B | ) | DATA = | 35 | ( 1 | 0 | 0 | 0 | 1 | 1 | B | ) |

TABLE II-continued

| | | (ROM IN) | | | | | | | | | | | | (ROM OUT) | | | | | | | |
|---|---|---|---|---|---|---|---|---|---|---|---|---|---|---|---|---|---|---|---|---|---|
| | | $A_7$ | $A_6$ | $A_5$ | $A_4$ | $A_3$ | $A_2$ | $A_1$ | $A_0$ | | | | | $D_5$ | $D_4$ | $D_3$ | $D_2$ | $D_1$ | $D_0$ | | |
| ADDRESS = | 35 | ( | 0 | 0 | 1 | 0 | 0 | 0 | 1 | 1 | B | ) | DATA = | 36 | ( | 1 | 0 | 0 | 1 | 0 | 0 | B | ) |
| ADDRESS = | 36 | ( | 0 | 0 | 1 | 0 | 0 | 1 | 0 | 0 | B | ) | DATA = | 37 | ( | 1 | 0 | 0 | 1 | 0 | 1 | B | ) |
| ADDRESS = | 37 | ( | 0 | 0 | 1 | 0 | 0 | 1 | 0 | 1 | B | ) | DATA = | 38 | ( | 1 | 0 | 0 | 1 | 1 | 0 | B | ) |
| ADDRESS = | 38 | ( | 0 | 0 | 1 | 0 | 0 | 1 | 1 | 0 | B | ) | DATA = | 39 | ( | 1 | 0 | 0 | 1 | 1 | 1 | B | ) |
| ADDRESS = | 39 | ( | 0 | 0 | 1 | 0 | 0 | 1 | 1 | 1 | B | ) | DATA = | 40 | ( | 1 | 0 | 1 | 0 | 0 | 0 | B | ) |
| ADDRESS = | 40 | ( | 0 | 0 | 1 | 0 | 1 | 0 | 0 | 0 | B | ) | DATA = | 41 | ( | 1 | 0 | 1 | 0 | 0 | 1 | B | ) |
| ADDRESS = | 41 | ( | 0 | 0 | 1 | 0 | 1 | 0 | 0 | 1 | B | ) | DATA = | 42 | ( | 1 | 0 | 1 | 0 | 1 | 0 | B | ) |
| ADDRESS = | 42 | ( | 0 | 0 | 1 | 0 | 1 | 0 | 1 | 0 | B | ) | DATA = | 43 | ( | 1 | 0 | 1 | 0 | 1 | 1 | B | ) |
| ADDRESS = | 43 | ( | 0 | 0 | 1 | 0 | 1 | 0 | 1 | 1 | B | ) | DATA = | 44 | ( | 1 | 0 | 1 | 1 | 0 | 0 | B | ) |
| ADDRESS = | 44 | ( | 0 | 0 | 1 | 0 | 1 | 1 | 0 | 0 | B | ) | DATA = | 45 | ( | 1 | 0 | 1 | 1 | 0 | 1 | B | ) |
| ADDRESS = | 45 | ( | 0 | 0 | 1 | 0 | 1 | 1 | 0 | 1 | B | ) | DATA = | 46 | ( | 1 | 0 | 1 | 1 | 1 | 0 | B | ) |
| ADDRESS = | 46 | ( | 0 | 0 | 1 | 0 | 1 | 1 | 1 | 0 | B | ) | DATA = | 47 | ( | 1 | 0 | 1 | 1 | 1 | 1 | B | ) |
| ADDRESS = | 47 | ( | 0 | 0 | 1 | 0 | 1 | 1 | 1 | 1 | B | ) | DATA = | 48 | ( | 1 | 1 | 0 | 0 | 0 | 0 | B | ) |
| ADDRESS = | 48 | ( | 0 | 0 | 1 | 1 | 0 | 0 | 0 | 0 | B | ) | DATA = | 49 | ( | 1 | 1 | 0 | 0 | 0 | 1 | B | ) |
| ADDRESS = | 49 | ( | 0 | 0 | 1 | 1 | 0 | 0 | 0 | 1 | B | ) | DATA = | 50 | ( | 1 | 1 | 0 | 0 | 1 | 0 | B | ) |
| ADDRESS = | 50 | ( | 0 | 0 | 1 | 1 | 0 | 0 | 1 | 0 | B | ) | DATA = | 51 | ( | 1 | 1 | 0 | 0 | 1 | 1 | B | ) |
| ADDRESS = | 51 | ( | 0 | 0 | 1 | 1 | 0 | 0 | 1 | 1 | B | ) | DATA = | 52 | ( | 1 | 1 | 0 | 1 | 0 | 0 | B | ) |
| ADDRESS = | 52 | ( | 0 | 0 | 1 | 1 | 0 | 1 | 0 | 0 | B | ) | DATA = | 53 | ( | 1 | 1 | 0 | 1 | 0 | 1 | B | ) |
| ADDRESS = | 53 | ( | 0 | 0 | 1 | 1 | 0 | 1 | 0 | 1 | B | ) | DATA = | 54 | ( | 1 | 1 | 0 | 1 | 1 | 0 | B | ) |
| ADDRESS = | 54 | ( | 0 | 0 | 1 | 1 | 0 | 1 | 1 | 0 | B | ) | DATA = | 55 | ( | 1 | 1 | 0 | 1 | 1 | 1 | B | ) |
| ADDRESS = | 55 | ( | 0 | 0 | 1 | 1 | 0 | 1 | 1 | 1 | B | ) | DATA = | 56 | ( | 1 | 1 | 1 | 0 | 0 | 0 | B | ) |
| ADDRESS = | 56 | ( | 0 | 0 | 1 | 1 | 1 | 0 | 0 | 0 | B | ) | DATA = | 57 | ( | 1 | 1 | 1 | 0 | 0 | 1 | B | ) |
| ADDRESS = | 57 | ( | 0 | 0 | 1 | 1 | 1 | 0 | 0 | 1 | B | ) | DATA = | 58 | ( | 1 | 1 | 1 | 0 | 1 | 0 | B | ) |
| ADDRESS = | 58 | ( | 0 | 0 | 1 | 1 | 1 | 0 | 1 | 0 | B | ) | DATA = | 59 | ( | 1 | 1 | 1 | 0 | 1 | 1 | B | ) |
| ADDRESS = | 59 | ( | 0 | 0 | 1 | 1 | 1 | 0 | 1 | 1 | B | ) | DATA = | 60 | ( | 1 | 1 | 1 | 1 | 0 | 0 | B | ) |
| ADDRESS = | 60 | ( | 0 | 0 | 1 | 1 | 1 | 1 | 0 | 0 | B | ) | DATA = | 61 | ( | 1 | 1 | 1 | 1 | 0 | 1 | B | ) |
| ADDRESS = | 61 | ( | 0 | 0 | 1 | 1 | 1 | 1 | 0 | 1 | B | ) | DATA = | 62 | ( | 1 | 1 | 1 | 1 | 1 | 0 | B | ) |
| ADDRESS = | 62 | ( | 0 | 0 | 1 | 1 | 1 | 1 | 1 | 0 | B | ) | DATA = | 63 | ( | 1 | 1 | 1 | 1 | 1 | 1 | B | ) |
| ADDRESS = | 63 | ( | 0 | 0 | 1 | 1 | 1 | 1 | 1 | 1 | B | ) | DATA = | 63 | ( | 1 | 1 | 1 | 1 | 1 | 1 | B | ) |
| ADDRESS = | 64 | ( | 0 | 1 | 0 | 0 | 0 | 0 | 0 | 0 | B | ) | DATA = | 16 | ( | 0 | 1 | 0 | 0 | 0 | 0 | B | ) |
| ADDRESS = | 65 | ( | 0 | 1 | 0 | 0 | 0 | 0 | 0 | 1 | B | ) | DATA = | 33 | ( | 1 | 0 | 0 | 0 | 0 | 1 | B | ) |
| ADDRESS = | 66 | ( | 0 | 1 | 0 | 0 | 0 | 0 | 1 | 0 | B | ) | DATA = | 34 | ( | 1 | 0 | 0 | 0 | 1 | 0 | B | ) |
| ADDRESS = | 67 | ( | 0 | 1 | 0 | 0 | 0 | 0 | 1 | 1 | B | ) | DATA = | 35 | ( | 1 | 0 | 0 | 0 | 1 | 1 | B | ) |
| ADDRESS = | 68 | ( | 0 | 1 | 0 | 0 | 0 | 1 | 0 | 0 | B | ) | DATA = | 36 | ( | 1 | 0 | 0 | 1 | 0 | 0 | B | ) |
| ADDRESS = | 69 | ( | 0 | 1 | 0 | 0 | 0 | 1 | 0 | 1 | B | ) | DATA = | 37 | ( | 1 | 0 | 0 | 1 | 0 | 1 | B | ) |
| ADDRESS = | 70 | ( | 0 | 1 | 0 | 0 | 0 | 1 | 1 | 0 | B | ) | DATA = | 38 | ( | 1 | 0 | 0 | 1 | 1 | 0 | B | ) |
| ADDRESS = | 71 | ( | 0 | 1 | 0 | 0 | 0 | 1 | 1 | 1 | B | ) | DATA = | 39 | ( | 1 | 0 | 0 | 1 | 1 | 1 | B | ) |
| ADDRESS = | 72 | ( | 0 | 1 | 0 | 0 | 1 | 0 | 0 | 0 | B | ) | DATA = | 40 | ( | 1 | 0 | 1 | 0 | 0 | 0 | B | ) |
| ADDRESS = | 73 | ( | 0 | 1 | 0 | 0 | 1 | 0 | 0 | 1 | B | ) | DATA = | 41 | ( | 1 | 0 | 1 | 0 | 0 | 1 | B | ) |
| ADDRESS = | 74 | ( | 0 | 1 | 0 | 0 | 1 | 0 | 1 | 0 | B | ) | DATA = | 42 | ( | 1 | 0 | 1 | 0 | 1 | 0 | B | ) |
| ADDRESS = | 75 | ( | 0 | 1 | 0 | 0 | 1 | 0 | 1 | 1 | B | ) | DATA = | 43 | ( | 1 | 0 | 1 | 0 | 1 | 1 | B | ) |
| ADDRESS = | 76 | ( | 0 | 1 | 0 | 0 | 1 | 1 | 0 | 0 | B | ) | DATA = | 44 | ( | 1 | 0 | 1 | 1 | 0 | 0 | B | ) |
| ADDRESS = | 77 | ( | 0 | 1 | 0 | 0 | 1 | 1 | 0 | 1 | B | ) | DATA = | 45 | ( | 1 | 0 | 1 | 1 | 0 | 1 | B | ) |
| ADDRESS = | 78 | ( | 0 | 1 | 0 | 0 | 1 | 1 | 1 | 0 | B | ) | DATA = | 46 | ( | 1 | 0 | 1 | 1 | 1 | 0 | B | ) |
| ADDRESS = | 79 | ( | 0 | 1 | 0 | 0 | 1 | 1 | 1 | 1 | B | ) | DATA = | 47 | ( | 1 | 0 | 1 | 1 | 1 | 1 | B | ) |
| ADDRESS = | 80 | ( | 0 | 1 | 0 | 1 | 0 | 0 | 0 | 0 | B | ) | DATA = | 48 | ( | 1 | 1 | 0 | 0 | 0 | 0 | B | ) |
| ADDRESS = | 81 | ( | 0 | 1 | 0 | 1 | 0 | 0 | 0 | 1 | B | ) | DATA = | 49 | ( | 1 | 1 | 0 | 0 | 0 | 1 | B | ) |
| ADDRESS = | 82 | ( | 0 | 1 | 0 | 1 | 0 | 0 | 1 | 0 | B | ) | DATA = | 50 | ( | 1 | 1 | 0 | 0 | 1 | 0 | B | ) |
| ADDRESS = | 83 | ( | 0 | 1 | 0 | 1 | 0 | 0 | 1 | 1 | B | ) | DATA = | 51 | ( | 1 | 1 | 0 | 0 | 1 | 1 | B | ) |
| ADDRESS = | 84 | ( | 0 | 1 | 0 | 1 | 0 | 1 | 0 | 0 | B | ) | DATA = | 52 | ( | 1 | 1 | 0 | 1 | 0 | 0 | B | ) |
| ADDRESS = | 85 | ( | 0 | 1 | 0 | 1 | 0 | 1 | 0 | 1 | B | ) | DATA = | 53 | ( | 1 | 1 | 0 | 1 | 0 | 1 | B | ) |
| ADDRESS = | 86 | ( | 0 | 1 | 0 | 1 | 0 | 1 | 1 | 0 | B | ) | DATA = | 54 | ( | 1 | 1 | 0 | 1 | 1 | 0 | B | ) |
| ADDRESS = | 87 | ( | 0 | 1 | 0 | 1 | 0 | 1 | 1 | 1 | B | ) | DATA = | 55 | ( | 1 | 1 | 0 | 1 | 1 | 1 | B | ) |
| ADDRESS = | 88 | ( | 0 | 1 | 0 | 1 | 1 | 0 | 0 | 0 | B | ) | DATA = | 56 | ( | 1 | 1 | 1 | 0 | 0 | 0 | B | ) |
| ADDRESS = | 89 | ( | 0 | 1 | 0 | 1 | 1 | 0 | 0 | 1 | B | ) | DATA = | 57 | ( | 1 | 1 | 1 | 0 | 0 | 1 | B | ) |
| ADDRESS = | 90 | ( | 0 | 1 | 0 | 1 | 1 | 0 | 1 | 0 | B | ) | DATA = | 58 | ( | 1 | 1 | 1 | 0 | 1 | 0 | B | ) |
| ADDRESS = | 91 | ( | 0 | 1 | 0 | 1 | 1 | 0 | 1 | 1 | B | ) | DATA = | 59 | ( | 1 | 1 | 1 | 0 | 1 | 1 | B | ) |
| ADDRESS = | 92 | ( | 0 | 1 | 0 | 1 | 1 | 1 | 0 | 0 | B | ) | DATA = | 60 | ( | 1 | 1 | 1 | 1 | 0 | 0 | B | ) |
| ADDRESS = | 93 | ( | 0 | 1 | 0 | 1 | 1 | 1 | 0 | 1 | B | ) | DATA = | 61 | ( | 1 | 1 | 1 | 1 | 0 | 1 | B | ) |
| ADDRESS = | 94 | ( | 0 | 1 | 0 | 1 | 1 | 1 | 1 | 0 | B | ) | DATA = | 62 | ( | 1 | 1 | 1 | 1 | 1 | 0 | B | ) |
| ADDRESS = | 95 | ( | 0 | 1 | 0 | 1 | 1 | 1 | 1 | 1 | B | ) | DATA = | 63 | ( | 1 | 1 | 1 | 1 | 1 | 1 | B | ) |
| ADDRESS = | 96 | ( | 0 | 1 | 1 | 0 | 0 | 0 | 0 | 0 | B | ) | DATA = | 32 | ( | 1 | 0 | 0 | 0 | 0 | 0 | B | ) |
| ADDRESS = | 97 | ( | 0 | 1 | 1 | 0 | 0 | 0 | 0 | 1 | B | ) | DATA = | 33 | ( | 1 | 0 | 0 | 0 | 0 | 1 | B | ) |
| ADDRESS = | 98 | ( | 0 | 1 | 1 | 0 | 0 | 0 | 1 | 0 | B | ) | DATA = | 34 | ( | 1 | 0 | 0 | 0 | 1 | 0 | B | ) |
| ADDRESS = | 99 | ( | 0 | 1 | 1 | 0 | 0 | 0 | 1 | 1 | B | ) | DATA = | 35 | ( | 1 | 0 | 0 | 0 | 1 | 1 | B | ) |
| ADDRESS = | 100 | ( | 0 | 1 | 1 | 0 | 0 | 1 | 0 | 0 | B | ) | DATA = | 36 | ( | 1 | 0 | 0 | 1 | 0 | 0 | B | ) |
| ADDRESS = | 101 | ( | 0 | 1 | 1 | 0 | 0 | 1 | 0 | 1 | B | ) | DATA = | 37 | ( | 1 | 0 | 0 | 1 | 0 | 1 | B | ) |
| ADDRESS = | 102 | ( | 0 | 1 | 1 | 0 | 0 | 1 | 1 | 0 | B | ) | DATA = | 38 | ( | 1 | 0 | 0 | 1 | 1 | 0 | B | ) |
| ADDRESS = | 103 | ( | 0 | 1 | 1 | 0 | 0 | 1 | 1 | 1 | B | ) | DATA = | 39 | ( | 1 | 0 | 0 | 1 | 1 | 1 | B | ) |
| ADDRESS = | 104 | ( | 0 | 1 | 1 | 0 | 1 | 0 | 0 | 0 | B | ) | DATA = | 40 | ( | 1 | 0 | 1 | 0 | 0 | 0 | B | ) |
| ADDRESS = | 105 | ( | 0 | 1 | 1 | 0 | 1 | 0 | 0 | 1 | B | ) | DATA = | 41 | ( | 1 | 0 | 1 | 0 | 0 | 1 | B | ) |
| ADDRESS = | 106 | ( | 0 | 1 | 1 | 0 | 1 | 0 | 1 | 0 | B | ) | DATA = | 42 | ( | 1 | 0 | 1 | 0 | 1 | 0 | B | ) |
| ADDRESS = | 107 | ( | 0 | 1 | 1 | 0 | 1 | 0 | 1 | 1 | B | ) | DATA = | 43 | ( | 1 | 0 | 1 | 0 | 1 | 1 | B | ) |
| ADDRESS = | 108 | ( | 0 | 1 | 1 | 0 | 1 | 1 | 0 | 0 | B | ) | DATA = | 44 | ( | 1 | 0 | 1 | 1 | 0 | 0 | B | ) |
| ADDRESS = | 109 | ( | 0 | 1 | 1 | 0 | 1 | 1 | 0 | 1 | B | ) | DATA = | 45 | ( | 1 | 0 | 1 | 1 | 0 | 1 | B | ) |
| ADDRESS = | 110 | ( | 0 | 1 | 1 | 0 | 1 | 1 | 1 | 0 | B | ) | DATA = | 46 | ( | 1 | 0 | 1 | 1 | 1 | 0 | B | ) |
| ADDRESS = | 111 | ( | 0 | 1 | 1 | 0 | 1 | 1 | 1 | 1 | B | ) | DATA = | 47 | ( | 1 | 0 | 1 | 1 | 1 | 1 | B | ) |
| ADDRESS = | 112 | ( | 0 | 1 | 1 | 1 | 0 | 0 | 0 | 0 | B | ) | DATA = | 48 | ( | 1 | 1 | 0 | 0 | 0 | 0 | B | ) |
| ADDRESS = | 113 | ( | 0 | 1 | 1 | 1 | 0 | 0 | 0 | 1 | B | ) | DATA = | 49 | ( | 1 | 1 | 0 | 0 | 0 | 1 | B | ) |
| ADDRESS = | 114 | ( | 0 | 1 | 1 | 1 | 0 | 0 | 1 | 0 | B | ) | DATA = | 50 | ( | 1 | 1 | 0 | 0 | 1 | 0 | B | ) |

TABLE II-continued

| | | (ROM IN) $A_7\ A_6\ A_5\ A_4\ A_3\ A_2\ A_1\ A_0$ | | | (ROM OUT) $D_5\ D_4\ D_3\ D_2\ D_1\ D_0$ | |
|---|---|---|---|---|---|---|
| ADDRESS = | 115 | ( 0 1 1 1 0 0 1 1 B ) | DATA = | 51 | ( 1 1 0 0 1 1 B | ) |
| ADDRESS = | 116 | ( 0 1 1 1 0 1 0 0 B ) | DATA = | 52 | ( 1 1 0 1 0 0 B | ) |
| ADDRESS = | 117 | ( 0 1 1 1 0 1 0 1 B ) | DATA = | 53 | ( 1 1 0 1 0 1 B | ) |
| ADDRESS = | 118 | ( 0 1 1 1 0 1 1 0 B ) | DATA = | 54 | ( 1 1 0 1 1 0 B | ) |
| ADDRESS = | 119 | ( 0 1 1 1 0 1 1 1 B ) | DATA = | 55 | ( 1 1 0 1 1 1 B | ) |
| ADDRESS = | 120 | ( 0 1 1 1 1 0 0 0 B ) | DATA = | 56 | ( 1 1 1 0 0 0 B | ) |
| ADDRESS = | 121 | ( 0 1 1 1 1 0 0 1 B ) | DATA = | 57 | ( 1 1 1 0 0 1 B | ) |
| ADDRESS = | 122 | ( 0 1 1 1 1 0 1 0 B ) | DATA = | 58 | ( 1 1 1 0 1 0 B | ) |
| ADDRESS = | 123 | ( 0 1 1 1 1 0 1 1 B ) | DATA = | 59 | ( 1 1 1 0 1 1 B | ) |
| ADDRESS = | 124 | ( 0 1 1 1 1 1 0 0 B ) | DATA = | 60 | ( 1 1 1 1 0 0 B | ) |
| ADDRESS = | 125 | ( 0 1 1 1 1 1 0 1 B ) | DATA = | 61 | ( 1 1 1 1 0 1 B | ) |
| ADDRESS = | 126 | ( 0 1 1 1 1 1 1 0 B ) | DATA = | 62 | ( 1 1 1 1 1 0 B | ) |
| ADDRESS = | 127 | ( 0 1 1 1 1 1 1 1 B ) | DATA = | 63 | ( 1 1 1 1 1 1 B | ) |
| ADDRESS = | 128 | ( 1 0 0 0 0 0 0 0 B ) | DATA = | 0 | ( 0 0 0 0 0 0 B | ) |
| ADDRESS = | 129 | ( 1 0 0 0 0 0 0 1 B ) | DATA = | 0 | ( 0 0 0 0 0 0 B | ) |
| ADDRESS = | 130 | ( 1 0 0 0 0 0 1 0 B ) | DATA = | 0 | ( 0 0 0 0 0 0 B | ) |
| ADDRESS = | 131 | ( 1 0 0 0 0 1 1 0 B ) | DATA = | 0 | ( 0 0 0 0 0 0 B | ) |
| ADDRESS = | 132 | ( 1 0 0 0 0 1 0 0 B ) | DATA = | 0 | ( 0 0 0 0 0 0 B | ) |
| ADDRESS = | 133 | ( 1 0 0 0 0 1 0 1 B ) | DATA = | 0 | ( 0 0 0 0 0 0 B | ) |
| ADDRESS = | 134 | ( 1 0 0 0 0 1 1 0 B ) | DATA = | 0 | ( 0 0 0 0 0 0 B | ) |
| ADDRESS = | 135 | ( 1 0 0 0 0 1 1 1 B ) | DATA = | 0 | ( 0 0 0 0 0 0 B | ) |
| ADDRESS = | 136 | ( 1 0 0 0 1 0 0 0 B ) | DATA = | 0 | ( 0 0 0 0 0 0 B | ) |
| ADDRESS = | 137 | ( 1 0 0 0 1 0 0 1 B ) | DATA = | 0 | ( 0 0 0 0 0 0 B | ) |
| ADDRESS = | 138 | ( 1 0 0 0 1 0 1 0 B ) | DATA = | 0 | ( 0 0 0 0 0 0 B | ) |
| ADDRESS = | 139 | ( 1 0 0 0 1 0 1 1 B ) | DATA = | 0 | ( 0 0 0 0 0 0 B | ) |
| ADDRESS = | 140 | ( 1 0 0 0 1 1 0 0 B ) | DATA = | 0 | ( 0 0 0 0 0 0 B | ) |
| ADDRESS = | 141 | ( 1 0 0 0 1 1 0 1 B ) | DATA = | 0 | ( 0 0 0 0 0 0 B | ) |
| ADDRESS = | 142 | ( 1 0 0 0 1 1 1 0 B ) | DATA = | 0 | ( 0 0 0 0 0 0 B | ) |
| ADDRESS = | 143 | ( 1 0 0 0 1 1 1 1 B ) | DATA = | 0 | ( 0 0 0 0 0 0 B | ) |
| ADDRESS = | 144 | ( 1 0 0 1 0 0 0 0 B ) | DATA = | 0 | ( 0 0 0 0 0 0 B | ) |
| ADDRESS = | 145 | ( 1 0 0 1 0 0 0 1 B ) | DATA = | 0 | ( 0 0 0 0 0 0 B | ) |
| ADDRESS = | 146 | ( 1 0 0 1 0 0 1 0 B ) | DATA = | 0 | ( 0 0 0 0 0 0 B | ) |
| ADDRESS = | 147 | ( 1 0 0 1 0 0 1 1 B ) | DATA = | 0 | ( 0 0 0 0 0 0 B | ) |
| ADDRESS = | 148 | ( 1 0 0 1 0 1 0 0 B ) | DATA = | 0 | ( 0 0 0 0 0 0 B | ) |
| ADDRESS = | 149 | ( 1 0 0 1 0 1 0 1 B ) | DATA = | 0 | ( 0 0 0 0 0 0 B | ) |
| ADDRESS = | 150 | ( 1 0 0 1 0 1 1 0 B ) | DATA = | 0 | ( 0 0 0 0 0 0 B | ) |
| ADDRESS = | 151 | ( 1 0 0 1 0 1 1 1 B ) | DATA = | 0 | ( 0 0 0 0 0 0 B | ) |
| ADDRESS = | 152 | ( 1 0 0 1 1 0 0 0 B ) | DATA = | 0 | ( 0 0 0 0 0 0 B | ) |
| ADDRESS = | 153 | ( 1 0 0 1 1 0 0 1 B ) | DATA = | 0 | ( 0 0 0 0 0 0 B | ) |
| ADDRESS = | 154 | ( 1 0 0 1 1 0 1 0 B ) | DATA = | 0 | ( 0 0 0 0 0 0 B | ) |
| ADDRESS = | 155 | ( 1 0 0 1 1 0 1 1 B ) | DATA = | 0 | ( 0 0 0 0 0 0 B | ) |
| ADDRESS = | 156 | ( 1 0 0 1 1 1 0 0 B ) | DATA = | 0 | ( 0 0 0 0 0 0 B | ) |
| ADDRESS = | 157 | ( 1 0 0 1 1 1 0 1 B ) | DATA = | 0 | ( 0 0 0 0 0 0 B | ) |
| ADDRESS = | 158 | ( 1 0 0 1 1 1 1 0 B ) | DATA = | 0 | ( 0 0 0 0 0 0 B | ) |
| ADDRESS = | 159 | ( 1 0 0 1 1 1 1 1 B ) | DATA = | 0 | ( 0 0 0 0 0 0 B | ) |
| ADDRESS = | 160 | ( 1 0 1 0 0 0 0 0 B ) | DATA = | 0 | ( 0 0 0 0 0 0 B | ) |
| ADDRESS = | 161 | ( 1 0 1 0 0 0 0 1 B ) | DATA = | 0 | ( 0 0 0 0 0 0 B | ) |
| ADDRESS = | 162 | ( 1 0 1 0 0 0 1 0 B ) | DATA = | 0 | ( 0 0 0 0 0 0 B | ) |
| ADDRESS = | 163 | ( 1 0 1 0 0 0 1 1 B ) | DATA = | 0 | ( 0 0 0 0 0 0 B | ) |
| ADDRESS = | 164 | ( 1 0 1 0 0 1 0 0 B ) | DATA = | 0 | ( 0 0 0 0 0 0 B | ) |
| ADDRESS = | 165 | ( 1 0 1 0 0 1 0 1 B ) | DATA = | 0 | ( 0 0 0 0 0 0 B | ) |
| ADDRESS = | 166 | ( 1 0 1 0 0 1 1 0 B ) | DATA = | 0 | ( 0 0 0 0 0 0 B | ) |
| ADDRESS = | 167 | ( 1 0 1 0 0 1 1 1 B ) | DATA = | 0 | ( 0 0 0 0 0 0 B | ) |
| ADDRESS = | 168 | ( 1 0 1 0 1 0 0 0 B ) | DATA = | 0 | ( 0 0 0 0 0 0 B | ) |
| ADDRESS = | 169 | ( 1 0 1 0 1 0 0 1 B ) | DATA = | 0 | ( 0 0 0 0 0 0 B | ) |
| ADDRESS = | 170 | ( 1 0 1 0 1 0 1 0 B ) | DATA = | 0 | ( 0 0 0 0 0 0 B | ) |
| ADDRESS = | 171 | ( 1 0 1 0 1 0 1 1 B ) | DATA = | 0 | ( 0 0 0 0 0 0 B | ) |
| ADDRESS = | 172 | ( 1 0 1 0 1 1 0 0 B ) | DATA = | 0 | ( 0 0 0 0 0 0 B | ) |
| ADDRESS = | 173 | ( 1 0 1 0 1 1 0 1 B ) | DATA = | 0 | ( 0 0 0 0 0 0 B | ) |
| ADDRESS = | 174 | ( 1 0 1 0 1 1 1 0 B ) | DATA = | 0 | ( 0 0 0 0 0 0 B | ) |
| ADDRESS = | 175 | ( 1 0 1 0 1 1 1 1 B ) | DATA = | 0 | ( 0 0 0 0 0 0 B | ) |
| ADDRESS = | 176 | ( 1 0 1 1 0 0 0 0 B ) | DATA = | 0 | ( 0 0 0 0 0 0 B | ) |
| ADDRESS = | 177 | ( 1 0 1 1 0 0 0 1 B ) | DATA = | 0 | ( 0 0 0 0 0 0 B | ) |
| ADDRESS = | 178 | ( 1 0 1 1 0 0 1 0 B ) | DATA = | 0 | ( 0 0 0 0 0 0 B | ) |
| ADDRESS = | 179 | ( 1 0 1 1 0 0 1 1 B ) | DATA = | 0 | ( 0 0 0 0 0 0 B | ) |
| ADDRESS = | 180 | ( 1 0 1 1 0 1 0 0 B ) | DATA = | 0 | ( 0 0 0 0 0 0 B | ) |
| ADDRESS = | 181 | ( 1 0 1 1 0 1 0 1 B ) | DATA = | 0 | ( 0 0 0 0 0 0 B | ) |
| ADDRESS = | 182 | ( 1 0 1 1 0 1 1 0 B ) | DATA = | 0 | ( 0 0 0 0 0 0 B | ) |
| ADDRESS = | 183 | ( 1 0 1 1 0 1 1 1 B ) | DATA = | 0 | ( 0 0 0 0 0 0 B | ) |
| ADDRESS = | 184 | ( 1 0 1 1 1 0 0 0 B ) | DATA = | 0 | ( 0 0 0 0 0 0 B | ) |
| ADDRESS = | 185 | ( 1 0 1 1 1 0 0 1 B ) | DATA = | 0 | ( 0 0 0 0 0 0 B | ) |
| ADDRESS = | 186 | ( 1 0 1 1 1 0 1 0 B ) | DATA = | 0 | ( 0 0 0 0 0 0 B | ) |
| ADDRESS = | 187 | ( 1 0 1 1 1 0 1 1 B ) | DATA = | 0 | ( 0 0 0 0 0 0 B | ) |
| ADDRESS = | 188 | ( 1 0 1 1 1 1 0 0 B ) | DATA = | 0 | ( 0 0 0 0 0 0 B | ) |
| ADDRESS = | 189 | ( 1 0 1 1 1 1 0 1 B ) | DATA = | 0 | ( 0 0 0 0 0 0 B | ) |
| ADDRESS = | 190 | ( 1 0 1 1 1 1 1 0 B ) | DATA = | 0 | ( 0 0 0 0 0 0 B | ) |
| ADDRESS = | 191 | ( 1 0 1 1 1 1 1 1 B ) | DATA = | 0 | ( 0 0 0 0 0 0 B | ) |
| ADDRESS = | 192 | ( 1 1 0 0 0 0 0 0 B ) | DATA = | 16 | ( 0 1 0 0 0 0 B | ) |
| ADDRESS = | 193 | ( 1 1 0 0 0 0 0 1 B ) | DATA = | 0 | ( 0 0 0 0 0 0 B | ) |
| ADDRESS = | 194 | ( 1 1 0 0 0 0 1 0 B ) | DATA = | 0 | ( 0 0 0 0 0 0 B | ) |

TABLE II-continued

| | | (ROM IN) | | | | | | | | | | | (ROM OUT) | | | | | | |
|---|---|---|---|---|---|---|---|---|---|---|---|---|---|---|---|---|---|---|---|
| | | $A_7$ | $A_6$ | $A_5$ | $A_4$ | $A_3$ | $A_2$ | $A_1$ | $A_0$ | | | | $D_5$ | $D_4$ | $D_3$ | $D_2$ | $D_1$ | $D_0$ | |
| ADDRESS = | 195 | ( 1 | 1 | 0 | 0 | 0 | 0 | 1 | 0 B ) | DATA = | 0 | ( 0 | 0 | 0 | 0 | 0 | 0 | B | ) |
| ADDRESS = | 196 | ( 1 | 1 | 0 | 0 | 0 | 1 | 0 | 0 B ) | DATA = | 34 | ( 1 | 0 | 0 | 0 | 1 | 0 | B | ) |
| ADDRESS = | 197 | ( 1 | 1 | 0 | 0 | 0 | 1 | 0 | 1 B ) | DATA = | 0 | ( 0 | 0 | 0 | 0 | 0 | 0 | B | ) |
| ADDRESS = | 198 | ( 1 | 1 | 0 | 0 | 0 | 1 | 1 | 0 B ) | DATA = | 0 | ( 0 | 0 | 0 | 0 | 0 | 0 | B | ) |
| ADDRESS = | 199 | ( 1 | 1 | 0 | 0 | 0 | 1 | 1 | 1 B ) | DATA = | 0 | ( 0 | 0 | 0 | 0 | 0 | 0 | B | ) |
| ADDRESS = | 200 | ( 1 | 1 | 0 | 0 | 1 | 0 | 0 | 0 B ) | DATA = | 4 | ( 0 | 0 | 0 | 1 | 0 | 0 | B | ) |
| ADDRESS = | 201 | ( 1 | 1 | 0 | 0 | 1 | 0 | 0 | 1 B ) | DATA = | 0 | ( 0 | 0 | 0 | 0 | 0 | 0 | B | ) |
| ADDRESS = | 202 | ( 1 | 1 | 0 | 0 | 1 | 0 | 1 | 0 B ) | DATA = | 0 | ( 0 | 0 | 0 | 0 | 0 | 0 | B | ) |
| ADDRESS = | 203 | ( 1 | 1 | 0 | 0 | 1 | 0 | 1 | 1 B ) | DATA = | 0 | ( 0 | 0 | 0 | 0 | 0 | 0 | B | ) |
| ADDRESS = | 204 | ( 1 | 1 | 0 | 0 | 1 | 1 | 0 | 0 B ) | DATA = | 42 | ( 1 | 0 | 1 | 0 | 1 | 0 | B | ) |
| ADDRESS = | 205 | ( 1 | 1 | 0 | 0 | 1 | 1 | 0 | 1 B ) | DATA = | 0 | ( 0 | 0 | 0 | 0 | 0 | 0 | B | ) |
| ADDRESS = | 206 | ( 1 | 1 | 0 | 0 | 1 | 1 | 1 | 0 B ) | DATA = | 0 | ( 0 | 0 | 0 | 0 | 0 | 0 | B | ) |
| ADDRESS = | 207 | ( 1 | 1 | 0 | 0 | 1 | 1 | 1 | 1 B ) | DATA = | 0 | ( 0 | 0 | 0 | 0 | 0 | 0 | B | ) |
| ADDRESS = | 208 | ( 1 | 1 | 0 | 1 | 0 | 0 | 0 | 0 B ) | DATA = | 8 | ( 0 | 0 | 1 | 0 | 0 | 0 | B | ) |
| ADDRESS = | 209 | ( 1 | 1 | 0 | 1 | 0 | 0 | 0 | 1 B ) | DATA = | 0 | ( 0 | 0 | 0 | 0 | 0 | 0 | B | ) |
| ADDRESS = | 210 | ( 1 | 1 | 0 | 1 | 0 | 0 | 1 | 0 B ) | DATA = | 0 | ( 0 | 0 | 0 | 0 | 0 | 0 | B | ) |
| ADDRESS = | 211 | ( 1 | 1 | 0 | 1 | 0 | 0 | 1 | 1 B ) | DATA = | 0 | ( 0 | 0 | 0 | 0 | 0 | 0 | B | ) |
| ADDRESS = | 212 | ( 1 | 1 | 0 | 1 | 0 | 1 | 0 | 0 B ) | DATA = | 50 | ( 1 | 1 | 0 | 0 | 1 | 0 | B | ) |
| ADDRESS = | 213 | ( 1 | 1 | 0 | 1 | 0 | 1 | 0 | 1 B ) | DATA = | 0 | ( 0 | 0 | 0 | 0 | 0 | 0 | B | ) |
| ADDRESS = | 214 | ( 1 | 1 | 0 | 1 | 0 | 1 | 1 | 0 B ) | DATA = | 0 | ( 0 | 0 | 0 | 0 | 0 | 0 | B | ) |
| ADDRESS = | 215 | ( 1 | 1 | 0 | 1 | 0 | 1 | 1 | 1 B ) | DATA = | 0 | ( 0 | 0 | 0 | 0 | 0 | 0 | B | ) |
| ADDRESS = | 216 | ( 1 | 1 | 0 | 1 | 1 | 0 | 0 | 0 B ) | DATA = | 20 | ( 0 | 1 | 0 | 1 | 0 | 0 | B | ) |
| ADDRESS = | 217 | ( 1 | 1 | 0 | 1 | 1 | 0 | 0 | 1 B ) | DATA = | 0 | ( 0 | 0 | 0 | 0 | 0 | 0 | B | ) |
| ADDRESS = | 218 | ( 1 | 1 | 0 | 1 | 1 | 0 | 1 | 0 B ) | DATA = | 0 | ( 0 | 0 | 0 | 0 | 0 | 0 | B | ) |
| ADDRESS = | 219 | ( 1 | 1 | 0 | 1 | 1 | 0 | 1 | 1 B ) | DATA = | 0 | ( 0 | 0 | 0 | 0 | 0 | 0 | B | ) |
| ADDRESS = | 220 | ( 1 | 1 | 0 | 1 | 1 | 1 | 0 | 0 B ) | DATA = | 58 | ( 1 | 1 | 1 | 0 | 1 | 0 | B | ) |
| ADDRESS = | 221 | ( 1 | 1 | 0 | 1 | 1 | 1 | 0 | 1 B ) | DATA = | 0 | ( 0 | 0 | 0 | 0 | 0 | 0 | B | ) |
| ADDRESS = | 222 | ( 1 | 1 | 0 | 1 | 1 | 1 | 1 | 0 B ) | DATA = | 0 | ( 0 | 0 | 0 | 0 | 0 | 0 | B | ) |
| ADDRESS = | 223 | ( 1 | 1 | 0 | 1 | 1 | 1 | 1 | 1 B ) | DATA = | 0 | ( 0 | 0 | 0 | 0 | 0 | 0 | B | ) |
| ADDRESS = | 224 | ( 1 | 1 | 1 | 0 | 0 | 0 | 0 | 0 B ) | DATA = | 32 | ( 1 | 0 | 0 | 0 | 0 | 0 | B | ) |
| ADDRESS = | 225 | ( 1 | 1 | 1 | 0 | 0 | 0 | 0 | 1 B ) | DATA = | 32 | ( 1 | 0 | 0 | 0 | 0 | 0 | B | ) |
| ADDRESS = | 226 | ( 1 | 1 | 1 | 0 | 0 | 0 | 1 | 0 B ) | DATA = | 33 | ( 1 | 0 | 0 | 0 | 0 | 1 | B | ) |
| ADDRESS = | 227 | ( 1 | 1 | 1 | 0 | 0 | 0 | 1 | 1 B ) | DATA = | 34 | ( 1 | 0 | 0 | 0 | 1 | 0 | B | ) |
| ADDRESS = | 228 | ( 1 | 1 | 1 | 0 | 0 | 1 | 0 | 0 B ) | DATA = | 35 | ( 1 | 0 | 0 | 0 | 1 | 1 | B | ) |
| ADDRESS = | 229 | ( 1 | 1 | 1 | 0 | 0 | 1 | 0 | 1 B ) | DATA = | 36 | ( 1 | 0 | 0 | 1 | 0 | 0 | B | ) |
| ADDRESS = | 230 | ( 1 | 1 | 1 | 0 | 0 | 1 | 1 | 0 B ) | DATA = | 37 | ( 1 | 0 | 0 | 1 | 0 | 1 | B | ) |
| ADDRESS = | 231 | ( 1 | 1 | 1 | 0 | 0 | 1 | 1 | 1 B ) | DATA = | 38 | ( 1 | 0 | 0 | 1 | 1 | 0 | B | ) |
| ADDRESS = | 232 | ( 1 | 1 | 1 | 0 | 1 | 0 | 0 | 0 B ) | DATA = | 39 | ( 1 | 0 | 0 | 1 | 1 | 1 | B | ) |
| ADDRESS = | 233 | ( 1 | 1 | 1 | 0 | 1 | 0 | 0 | 1 B ) | DATA = | 40 | ( 1 | 0 | 1 | 0 | 0 | 0 | B | ) |
| ADDRESS = | 234 | ( 1 | 1 | 1 | 0 | 1 | 0 | 1 | 0 B ) | DATA = | 41 | ( 1 | 0 | 1 | 0 | 0 | 1 | B | ) |
| ADDRESS = | 235 | ( 1 | 1 | 1 | 0 | 1 | 0 | 1 | 1 B ) | DATA = | 42 | ( 1 | 0 | 1 | 0 | 1 | 0 | B | ) |
| ADDRESS = | 236 | ( 1 | 1 | 1 | 0 | 1 | 1 | 0 | 0 B ) | DATA = | 43 | ( 1 | 0 | 1 | 0 | 1 | 1 | B | ) |
| ADDRESS = | 237 | ( 1 | 1 | 1 | 0 | 1 | 1 | 0 | 1 B ) | DATA = | 44 | ( 1 | 0 | 1 | 1 | 0 | 0 | B | ) |
| ADDRESS = | 238 | ( 1 | 1 | 1 | 0 | 1 | 1 | 1 | 0 B ) | DATA = | 45 | ( 1 | 0 | 1 | 1 | 0 | 1 | B | ) |
| ADDRESS = | 239 | ( 1 | 1 | 1 | 0 | 1 | 1 | 1 | 1 B ) | DATA = | 46 | ( 1 | 0 | 1 | 1 | 1 | 0 | B | ) |
| ADDRESS = | 240 | ( 1 | 1 | 1 | 1 | 0 | 0 | 0 | 0 B ) | DATA = | 47 | ( 1 | 0 | 1 | 1 | 1 | 1 | B | ) |
| ADDRESS = | 241 | ( 1 | 1 | 1 | 1 | 0 | 0 | 0 | 1 B ) | DATA = | 48 | ( 1 | 1 | 0 | 0 | 0 | 0 | B | ) |
| ADDRESS = | 242 | ( 1 | 1 | 1 | 1 | 0 | 0 | 1 | 0 B ) | DATA = | 49 | ( 1 | 1 | 0 | 0 | 0 | 1 | B | ) |
| ADDRESS = | 243 | ( 1 | 1 | 1 | 1 | 0 | 0 | 1 | 1 B ) | DATA = | 50 | ( 1 | 1 | 0 | 0 | 1 | 0 | B | ) |
| ADDRESS = | 244 | ( 1 | 1 | 1 | 1 | 0 | 1 | 0 | 0 B ) | DATA = | 51 | ( 1 | 1 | 0 | 0 | 1 | 1 | B | ) |
| ADDRESS = | 245 | ( 1 | 1 | 1 | 1 | 0 | 1 | 0 | 1 B ) | DATA = | 52 | ( 1 | 1 | 0 | 1 | 0 | 0 | B | ) |
| ADDRESS = | 246 | ( 1 | 1 | 1 | 1 | 0 | 1 | 1 | 0 B ) | DATA = | 53 | ( 1 | 1 | 0 | 1 | 0 | 1 | B | ) |
| ADDRESS = | 247 | ( 1 | 1 | 1 | 1 | 0 | 1 | 1 | 1 B ) | DATA = | 54 | ( 1 | 1 | 0 | 1 | 1 | 0 | B | ) |
| ADDRESS = | 248 | ( 1 | 1 | 1 | 1 | 1 | 0 | 0 | 0 B ) | DATA = | 55 | ( 1 | 1 | 0 | 1 | 1 | 1 | B | ) |
| ADDRESS = | 249 | ( 1 | 1 | 1 | 1 | 1 | 0 | 0 | 1 B ) | DATA = | 56 | ( 1 | 1 | 1 | 0 | 0 | 0 | B | ) |
| ADDRESS = | 250 | ( 1 | 1 | 1 | 1 | 1 | 0 | 1 | 0 B ) | DATA = | 57 | ( 1 | 1 | 1 | 0 | 0 | 1 | B | ) |
| ADDRESS = | 251 | ( 1 | 1 | 1 | 1 | 1 | 0 | 1 | 1 B ) | DATA = | 58 | ( 1 | 1 | 1 | 0 | 1 | 0 | B | ) |
| ADDRESS = | 252 | ( 1 | 1 | 1 | 1 | 1 | 1 | 0 | 0 B ) | DATA = | 59 | ( 1 | 1 | 1 | 0 | 1 | 1 | B | ) |
| ADDRESS = | 253 | ( 1 | 1 | 1 | 1 | 1 | 1 | 0 | 1 B ) | DATA = | 60 | ( 1 | 1 | 1 | 1 | 0 | 0 | B | ) |
| ADDRESS = | 254 | ( 1 | 1 | 1 | 1 | 1 | 1 | 1 | 0 B ) | DATA = | 61 | ( 1 | 1 | 1 | 1 | 0 | 1 | B | ) |
| ADDRESS = | 255 | ( 1 | 1 | 1 | 1 | 1 | 1 | 1 | 1 B ) | DATA = | 62 | ( 1 | 1 | 1 | 1 | 1 | 0 | B | ) |

From TABLES I and II above, all the operation of the accumulating time control circuit AGC shown in FIG. 8 will be appreciated.

As described above in detail, according to the present invention, the time from the power-on of the system until the right operation of the system is performed can be shortened greatly as compared with the case where the accumulating time is prolonged or shortened at each step from the predetermined initial accumulating time, and a proper accumulating time can be reached in a very short time, whereby the speed of operation of the system can be enhanced. While ROM has been used in the present embodiment, ROM need not always be used, but the present invention can also be realized by using, for example, PLA (programmable logic array) or a wired logic. Further, a similar method can also be realized by using a combination of a successive approximation register designated by Model No. 74LS502 of TI Inc. and a presettable up-down counter designated by Model No. 74LS161 of the same company.

We claim:

1. A radiation sensing system comprising:
   (A) accumulation type radiation sensing means which produces an electrical indication by accumulating incident radiation over an accumulation time;
   (B) discrimination means for discriminating the value of said electrical indication produced by said sensing means, said discrimination means discriminating that said sensing means is in a first state when an accumulating value indicated by said electrical indication is larger than a first value and said means discriminating that said sensing means is in a second state when said accumulation value is smaller than a second value; and (C) control means for controlling the accumulation time of said sensing means, said control means decreasing said accumulating time when said discrimination means discriminates that said sensing means is in said second state, and increasing said accumulation time when said discrimination means discriminates that said sensing means is in said first state, wherein the amount of increase or decrease in said accumulation time is controlled so as to become a half of the previous increase or decrease in said accumulation time set by said control means until the accumulation time reaches a proper value.

2. A radiation sensing system comprising:

(A) accumulation rype radiation sensing means for producing an electrical indication by accumulating incident radiation over an accumulation time;

(B) control means for controlling the accumulation time of said sensing means, said control means having the following two control modes in order to control said accumulation time to be a proper value;
   (a) a successively approximating mode under which the control means changes said accumulation time by different steps to control said accumulation time to be a proper value;
   (b) a follow-up mode under which the control means changes said accumulation time by a constant step to control said accumulation time to be a proper value; and (C) drive means for driving said control means, said drive means driving said control means to control said accumulation time under said successively approximating mode, and after once said accumulation time has reached a proper value, said drive means driving said control means to control said accumulation time under said follow-up mode.

3. A system according to claim 2 further comprising initiation means for initiating the operation of said drive means,
said drive means driving said control means under said successively approximating mode in response to the initiation of said initiation means.

4. The system according to claim 3, wherein said control means includes a programmed Read-Only-Memory.

5. A system according to claim 3, wherein said initiation means executes the initiation of said drive means by performing the initiation of said system in response to the turning-on of a power source.

6. The system according to claim 1 or 2, wherein said control means includes a programmed Read-Only-Memory.

7. A radiation sensing system comprising:

(a) accumulation type radiation sensing means for producing electrical indication by accumulating incident radiation over an accumulation time;

(B) control means for controlling said accumulation time of said sensing means, said control means having the following two control modes in order to adjust said accumulation time to be a proper value;
   (a) a first mode, under which the control means changes said accumulation time by a constant value to control said accumulation time to be a proper value;
   (b) a second mode under which the control means, at least one time, changes said accumulation time by a value larger than said constant value in said first mode to control said accumulation time to be a proper value; and (C) drive means for driving said control means so that firstly, said control means is driven under said second mode and after once said accumulation time has reached a proper value, said control means is driven under said first mode.

* * * * *